United States Patent
Hattori et al.

(10) Patent No.: US 10,550,287 B2
(45) Date of Patent: Feb. 4, 2020

(54) SOLVENT-FREE SILICONE-MODIFIED POLYIMIDE RESIN COMPOSITION

(71) Applicant: SHIN-ETSU CHEMICAL CO., LTD., Tokyo (JP)

(72) Inventors: Hatsuhiko Hattori, Annaka (JP); Yoshinori Yoneda, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/060,161

(22) PCT Filed: Dec. 13, 2016

(86) PCT No.: PCT/JP2016/087012
§ 371 (c)(1),
(2) Date: Jun. 7, 2018

(87) PCT Pub. No.: WO2017/110576
PCT Pub. Date: Jun. 29, 2017

(65) Prior Publication Data
US 2018/0312723 A1    Nov. 1, 2018

(30) Foreign Application Priority Data
Dec. 25, 2015   (JP) .................. 2015-252901

(51) Int. Cl.
*C09D 183/10* (2006.01)
*C09D 7/62* (2018.01)
(Continued)

(52) U.S. Cl.
CPC ............ *C09D 183/10* (2013.01); *C09D 4/06* (2013.01); *C09D 7/62* (2018.01); *C09D 133/06* (2013.01);
(Continued)

(58) Field of Classification Search
CPC ..... C08G 77/455; C09D 183/10; C08L 83/10; C08F 283/124; C08F 283/128; C08K 3/36
See application file for complete search history.

(56) References Cited

U.S. PATENT DOCUMENTS

| 4,972,005 A | * | 11/1990 | Aoki | .................. C08F 283/124 522/99 |
| 2002/0188069 A1 | * | 12/2002 | Sugo | .................. C08G 77/455 525/100 |

(Continued)

FOREIGN PATENT DOCUMENTS

| JP | 2006-104447 A | 4/2006 |
| JP | 2006-269250 A | 10/2006 |

(Continued)

OTHER PUBLICATIONS

Ciba Darocur 1173 Data Sheet, Coating Effects Segment. (Year: 2001).*

(Continued)

*Primary Examiner* — Michael M Dollinger
(74) *Attorney, Agent, or Firm* — Birch, Stewart, Kolasch & Birch, LLP

(57) ABSTRACT

A solvent-free silicone-modified polyimide resin composition having fluidity and including no solvent, the composition containing
(A) a silicone-modified polyimide resin of formula (1), $$Ee\text{-}Ff\text{-}Gg \qquad (1)$$

(E is formula (2), F is formula (3), and G is a diamine-derived divalent residue; f+e+g=100 mol %, the molar ratio of f/(e+g) is 0.8-1.2)

(Continued)

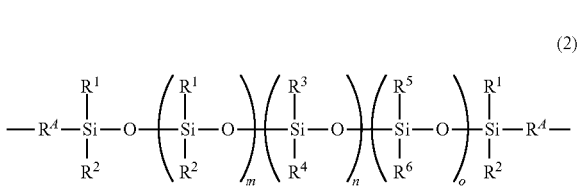

(2)

($R^A$ is a divalent hydrocarbon group, $R^1$-$R^4$ are monovalent hydrocarbon groups, $R^5$ and $R^6$ are an alkyl group, aryl group, or aralkyl group; m, n, and o are 0-20, n+o≥1, m+n+o=1-60)

$$\text{-Im-X-Im-} \quad (3)$$

(Im is a cyclic group including a cyclic imide structure, X is a single bond, oxygen, sulfur, sulfide group, sulfone group, carbonyl group, $-NR^N-$, $-CR^B{}_2-$, $R^{Ar}{}_h-$, $-R^{Ar}{}_h(OR^{Ar})_i-$, alkylene group, trivalent group having one H eliminated from said group, or arylene-alkylene group), (B) a polymerizable compound,
(C) a polymerization initiator, and
(D) hydrophobic fumed silica.

This composition has excellent handleability due to its fluidity and thixotropy.

20 Claims, 1 Drawing Sheet

(51) Int. Cl.
| | | |
|---|---|---|
| C09D 4/06 | (2006.01) | |
| C09D 133/06 | (2006.01) | |
| C09J 4/06 | (2006.01) | |
| C09J 11/04 | (2006.01) | |
| C09J 133/06 | (2006.01) | |
| C09J 183/10 | (2006.01) | |

(52) U.S. Cl.
CPC ............. *C09J 4/06* (2013.01); *C09J 11/04* (2013.01); *C09J 133/06* (2013.01); *C09J 183/10* (2013.01)

(56) References Cited

U.S. PATENT DOCUMENTS

| | | | | |
|---|---|---|---|---|
| 2006/0052476 | A1* | 3/2006 | Yoneda | C08G 73/106 522/99 |
| 2006/0084714 | A1* | 4/2006 | Yoneda | C03C 17/30 522/172 |
| 2009/0186295 | A1* | 7/2009 | Win | C08G 73/106 430/270.1 |
| 2009/0234072 | A1* | 9/2009 | Nakagawa | C08L 83/06 525/100 |
| 2010/0056730 | A1* | 3/2010 | Yoneda | C08G 59/4042 525/408 |
| 2010/0118261 | A1* | 5/2010 | McGee | C08F 283/124 351/159.33 |
| 2010/0119744 | A1 | 5/2010 | Yokoyama et al. | |
| 2012/0139131 | A1 | 6/2012 | Sugo et al. | |
| 2015/0017114 | A1* | 1/2015 | Braun | A61Q 19/00 424/78.02 |
| 2015/0290116 | A1 | 10/2015 | Cavazzuti et al. | |

FOREIGN PATENT DOCUMENTS

| | | | |
|---|---|---|---|
| JP | 2007-14637 A | 1/2007 | |
| JP | 2009-29843 A | 2/2009 | |
| JP | 2012-119599 A | 6/2012 | |
| JP | 2015-174967 A | 8/2013 | |
| JP | 2013-155245 A | 10/2015 | |
| JP | 2017222745 A | * 12/2017 | .............. C09D 7/61 |
| WO | WO 2015/077161 A1 | 5/2015 | |

OTHER PUBLICATIONS

International Search Report (PCT/ISA/210) issued in PCT/JP2016/087012, dated Feb. 21, 2017.
Written Opinion of the International Searching Authority (PCT/ISA/237) issued in PCT/JP2016/087012, dated Feb. 21, 2017.

\* cited by examiner

TRANSMITTANCE SPECTRUM
IN SYNTHESIS EXAMPLE 6

SOLVENT-FREE SILICONE-MODIFIED POLYIMIDE RESIN COMPOSITION

TECHNICAL FIELD

The present invention relates to a silicone-modified polyimide resin-containing composition which contains substantially no solvent and is colorless in the visible light spectrum. More particularly, the invention relates to a solventless silicone-modified polyimide-containing composition which, while having flowability at a normal temperature, is also thixotropic, and which is curable with ultraviolet light and/or visible light.

BACKGROUND ART

In general, polyimide resins have a high heat resistance and excellent electrical insulation, and thus are utilized as a printed circuit board and heat-resistant adhesive tape material. In the form of resin varnishes, they are also utilized as surface protection films and interlayer dielectrics for electrical components and semiconductor materials. However, because polyimide resins dissolve only in limited solvents, the method typically used is to apply polyamic acid, which is a polyimide precursor that dissolves with relative ease in various organic solvents, onto a substrate and then subject the polyamic acid to cyclodehydration by high-temperature treatment, thereby obtaining a cured product made of polyimide resin.

In contrast, methods for obtaining a cured polyimide resin using ultraviolet light or visible light proceed at low temperature and in a short time, and so there exists an increased demand for adhesives and coating agents obtained by UV curing polyimide resins (Patent Document 1). Also, thixotropy is desired in order to discourage liquid sag and prevent stringing during application as an adhesive or a coating agent, and to keep a glob of applied material from spreading. Moreover, in the bonding of vehicle-mounted objects in transport equipment such as automobiles, airplanes and ships, when the cured adhesive is hard, problems such as vibration-induced peeling and cracking sometimes arise, and so a storage modulus and good adhesiveness capable of withstanding vibrations is desired.

PRIOR ART DOCUMENTS

Patent Documents

Patent Document 1: JP-A 2006-104447

SUMMARY OF INVENTION

Technical Problem

It is therefore an object of this invention to provide a solventless silicone-modified polyimide resin composition which is suitable as an adhesive and coating agent that is curable with ultraviolet light and/or visible light, which prevents liquid sag on account of a low loading of inorganic compound filler or prevents air bubble entrainment and unevenness during coating on account of a high loading, and which moreover exhibits thixotropy that maintains moldability and also exhibits a low elastic modulus that suppresses increased hardness of the cured product due to the loading of inorganic compound filler.

Solution to Problem

The inventors have conducted extensive investigations in order to achieve these objects. As a result, they have discovered a solventless silicone-modified polyimide resin composition having excellent handleability.

Accordingly, the invention provides the following solventless silicone-modified polyimide resin composition.

[1] A solventless silicone-modified polyimide resin composition which has flowability at 25° C. and is free of solvent, comprising:

(A) 100 parts by weight of a silicone-modified polyimide resin of formula (1) below $$Ee\text{-}Ff\text{-}Gg \qquad (1)$$

(wherein E, F and G are randomly bonded recurring units, E being a divalent residue of formula (2) from a diamino-modified silicone

[Chem. 1]

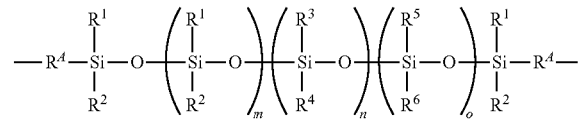

(2)

(wherein $R^A$ is a substituted or unsubstituted divalent hydrocarbon group of 1 to 10 carbon atoms, $R^1$ and $R^2$ are each independently a substituted or unsubstituted monovalent hydrocarbon group of 1 to 10 carbon atoms, $R^3$ and $R^4$ are each independently a substituted or unsubstituted monovalent hydrocarbon group of 1 to 10 carbon atoms, $R^5$ and $R^6$ are each independently an organic group selected from among substituted or unsubstituted alkyl groups, aryl groups and aralkyl groups of 1 to 16 carbon atoms; and the subscripts m, n and o are each integers from 0 to 20 which satisfy the conditions $n+o \geq 1$ and $m+n+o=1$ to 60), F being a residue of formula (3) from a tetracarboxylic dianhydride $$\text{-lm-X-lm-} \qquad (3)$$

(wherein lm is a cyclic group containing on an end a cyclic imide structure, and X is a single bond, an oxygen atom, a sulfur atom, a sulfide group, a sulfone group, a carbonyl group, $-NR^N-$ ($R^N$ being a linear, branched or cyclic monovalent hydrocarbon group of 1 to 12 carbon atoms), $-CR^B_2-$ (each $R^B$ being independently a hydrogen atom or a substituted or unsubstituted monovalent hydrocarbon group of 1 to 12 carbon atoms), $-R^{Ar}_h-$ ($R^{Ar}$ being a divalent arylene group of 6 to 12 carbon atoms, and the subscript h being an integer from 1 to 6), a trivalent or tetravalent group obtained by detaching one or two hydrogen atoms from an arylene group, $-R^{Ar}_h(OR^{Ar})_i-$ ($R^{Ar}$ and h being defined in the same way as above, and the subscript i being from 1 to 5), a linear, branched or cyclic alkylene group of 1 to 12 carbon atoms, a trivalent group obtained by detaching one hydrogen atom from the alkylene group, or a divalent to tetravalent organic group selected from among arylenealkylene groups) and G being a divalent residue from a diamine, f+e+g=100 mol %, and the molar ratio f/(e+g) is from 0.8 to 1.2);

(B) from 100 to 2,000 parts by weight of a polymerizable compound;

(C) from 0.1 to 30 parts by weight of a polymerization initiator per 100 parts by weight of components (A) and (B) combined; and (D) from 1 to 50 parts by weight of hydrophobic fumed silica per 100 parts by weight of components (A) and (B) combined.

[2] The solventless silicone-modified polyimide resin composition of [1], wherein lm is selected from the following groups

[Chem. 2]

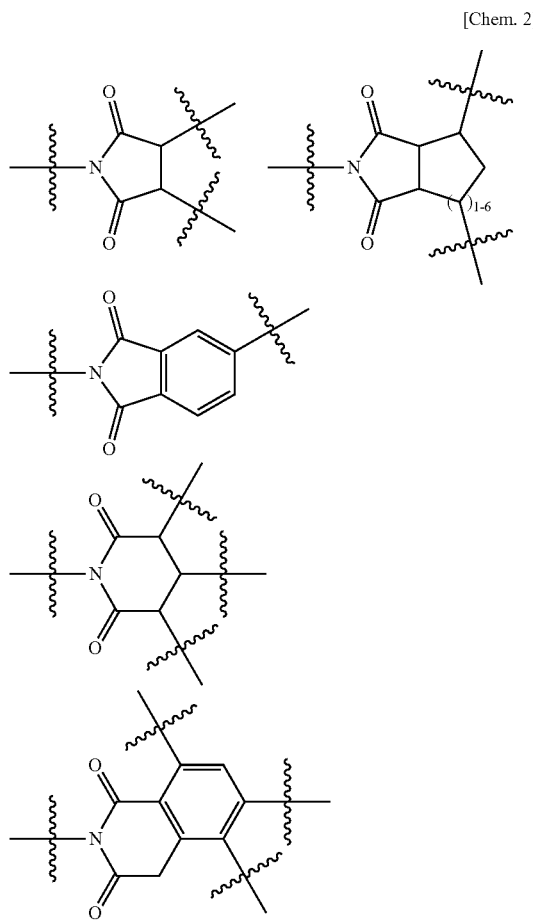

(wherein bond symbols with a squiggly line represent sites available for bonding, with those sites on a nitrogen atom bonding to E or G and other sites bonding to X).

[3] The solventless silicone-modified polyimide resin composition of [1] or [2], wherein component (B) is a radical polymerizable compound.

[4] The solventless silicone-modified polyimide resin composition of [3], wherein component (B) is a (meth) acrylate ester compound.

[5] The solventless silicone-modified polyimide resin composition of any of [1] to [4], wherein component (C) is a thermally decomposing radical initiator or a radiation-activated initiator.

[6] The solventless silicone-modified polyimide resin composition of any of [1] to [5], wherein component (D) is a hydrophobic fumed silica having a bulk density lower than 1 g/mL, an average primary particle size of from 1 to 100 nm, and a BET specific surface area of from 100 to 300 m$^2$/g,

[7] The solventless silicone-modified polyimide resin composition of any of [1] to [6], wherein the composition has a viscosity at 25° C. of from 3 to 1,000 Pa·s.

[8] The solventless silicone-modified polyimide resin composition of any of [1] to [7], further comprising (H) a modifying additive.

[9] The solventless silicone-modified polyimide resin composition of any of [1] to [8], further comprising (I) a leveling agent.

[10] The solventless silicone-modified polyimide resin composition of any of [1] to [9], further comprising (J) a dye.

[11] An adhesive comprising the composition of any of [1] to [10].

[12] A coating agent comprising the composition of any of [1] to [10].

[13] A cured silicone-modified polyimide resin film obtained by curing the solventless silicone-modified polyimide resin composition of any of [1] to [10] with ultraviolet light and/or visible light, wherein the film has a storage modulus of at least 1 MPa and not more than 500 MPa.

[14] A cured silicone-modified polyimide resin film obtained by curing the solventless silicone-modified polyimide resin composition of any of [1] to [9] with ultraviolet light and/or visible light, wherein the film has a light transmittance at wavelengths in the visible light spectrum of at least 80% and has, in the L*a*b* color space, an L* value of at least 80, an a* value of at least −10 and less than 10 and a b* value of at least −10 and less than 10.

Advantageous Effects of the Invention

The silicone-modified polyimide resin-containing composition of the invention has flowability at a normal temperature and also is thixotropic, thus having excellent handleability. The cured product obtained after curing this composition with ultraviolet light and/or visible light has a low elasticity and yet can serve as an adhesive having a good bonding strength or a coating having good adhesion.

BRIEF DESCRIPTION OF THE DIAGRAMS

DESCRIPTION OF THE EMBODIMENTS

Figure 1:
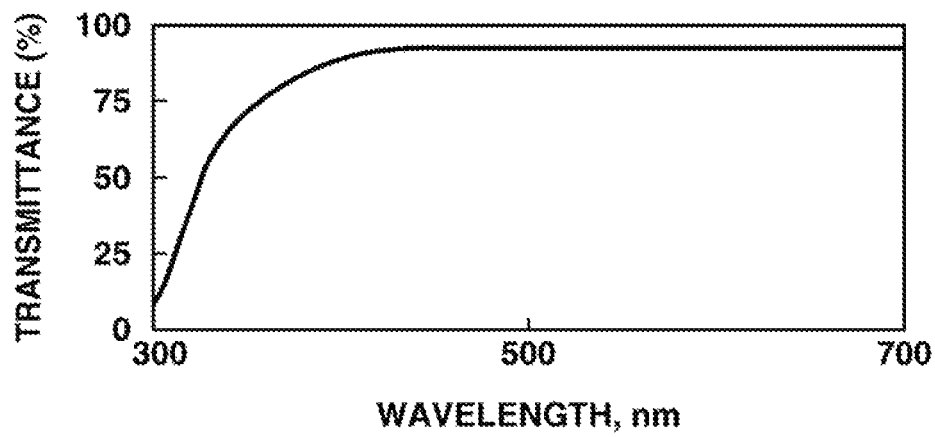
FIG. 1 is a transmittance spectrum for the silicone-modified polyimide resin synthesized in Synthesis Example 1.
Figure 2:
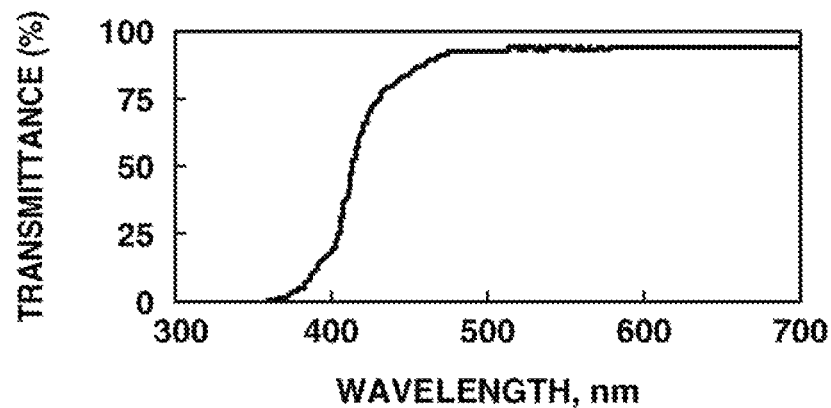
FIG. 2 is a transmittance spectrum for the silicone-modified polyimide resin synthesized in Synthesis Example 6.

The invention is described in detail below.

The silicone-modified polyimide-containing composition of the invention is a solventless silicone-modified polyimide resin composition which includes
(A) a silicone-modified polyimide resin,
(B) a polymerizable compound,
(C) a polymerization initiator and
(D) a hydrophobic fumed silica gel, and
which is characterized by having flowability at 25° C. and containing no solvent.

—(A) Silicone-Modified Polyimide Resin—

The silicone-modified polyimide of component (A) serves as the base polymer of this composition. A polymer of formula (1) below may be used as this silicone-modified polyimide.

$$Ee\text{-}Ff\text{-}Gg \qquad (1)$$

In formula (1), E is a divalent residue of formula (2) from a diamino-modified silicone, F is a residue of formula (3) from a tetracarboxylic dianhydride, and G is a divalent residue from a diamine.

Recurring units of E or G are randomly bonded to F, f+e+g=100 mol %, and the molar ratio f/(e+g) is from 0.8 to 1.2, preferably from 0.95 to 1.05.

[Chem. 3]

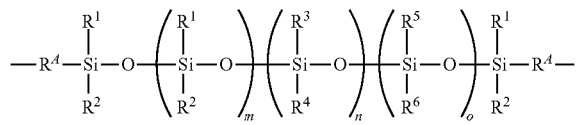

(2)

In Formula (2), $R^4$ is a substituted or unsubstituted divalent hydrocarbon group of 1 to 10 carbon atoms, $R^1$ and $R^2$ are each independently a substituted or unsubstituted monovalent hydrocarbon group of 1 to 10 carbon atoms, $R^3$ and $R^4$ are each independently a substituted or unsubstituted monovalent hydrocarbon group of 1 to 10 carbon atoms, and $R^5$ and $R^6$ are each independently an organic group selected from among substituted or unsubstituted alkyl groups, aryl groups and aralkyl groups of 1 to 16 carbon atoms. The subscripts m, n and o are each integers from 0 to 20 which satisfy the conditions $n+o \geq 1$ and $m+n+o=1$ to 60.

Here, $R^4$ is a substituted or unsubstituted linear, branched or cyclic divalent hydrocarbon group of 1 to 10 carbon atoms which may include a heteroatom such as an oxygen atom or nitrogen atom, and which may include the heteroatom in an aromatic ring. Specific examples include groups selected from methylene, 1,2-ethylene, 1,3-propylene, 1,3-butylene, 1,4-butylene, 1,3-pentylene, 1,4-pentylene, 1,5-pentylene, 1,6-hexylene, 1,7-heptylene, 1,8-octylene, 1,9-nonylene, 1,10-decylene, 2-(3-prop-1-oxy)eth-1-ylene, 3-(3-prop-1-oxy)prop-1-ylene, 4-(3-prop-1-oxy)but-1-ylene, 5-(3-prop-1-oxy)pent-1-y lene, 6-(3-prop-1-oxy)hex-1-ylene, 1,3-cyclohexylene, 1,4-cyclohexylene, 1,3-cycloheptylene, 1,4-cycloheptylene, N,N-piperidinylene and 1,4-dioxacyclohexa-2,5-ylene groups. Owing to ready availability, a 1,3-propylene group is preferred.

$R^1$ and $R^2$ are each independently a substituted or unsubstituted linear, branched or cyclic monovalent alkyl group of 1 to 10 carbon atoms. Specific examples include groups selected from among alkyl groups such as methyl, ethyl, propyl, isopropyl, butyl, isobutyl, tert-butyl, pentyl, neopentyl, hexyl, cyclohexyl, heptyl, octyl, nonyl, decyl and decalyl groups, and fluorine-substituted alkyl groups. Lower alkyl groups such as methyl, ethyl and propyl are preferred.

$R^1$ and $R^4$ are each independently a substituted or unsubstituted linear, branched or cyclic alkyl or alkenyl group of 1 to 10 carbon atoms. Specific examples include alkyl groups such as methyl, ethyl, propyl, butyl, pentyl, hexyl, heptyl, octyl, nonyl, decyl and decalyl groups; alkenyl groups such as vinyl, allyl, propenyl, isopropenyl, butenyl, hexenyl, cyclohexenyl and octenyl groups; and any of these groups in which some or all of the hydrogen atoms are substituted with fluorine atoms, such as 3,3,3-trifluoropropyl and 3,3,4,4,4-pentafluorobutyl groups. Methyl, ethyl, propyl, vinyl and 3,3,3-trifluoropropyl groups are more preferred.

$R^5$ and $R^6$ are each independently linear, branched or cyclic alkyl groups of 1 to 10 carbon atoms, monovalent aryl groups of 5 to 12 carbon atoms or aralkyl groups of 7 to 16 carbon atoms. Illustrative examples include alkyl groups such as those mentioned above; aryl groups such as phenyl, 2-methylphenyl, 3-methylphenyl, 4-methylphenyl, 2,3-dimethylphenyl, 2,4-dimethylphenyl, 2,6-dimethylphenyl, 3,4-dimethylphenyl, 3,5-dimethylphenyl, 2,3,4-trimethylphenyl, 2,3,5-trimethylphenyl, 2,4,6-trimethylphenyl and indenyl groups; and aralkyl groups such as phenylmethylene, 2-phenyl-1-ethylene, 3-phenyl-1-propylene, phenylbutylene, 3-phenyl-1-pentylene, 4-phenyl-1-pentylene, 5-phenyl-1-pentylene, 6-phenyl-1-hexylene, 7-phenyl-1-heptylene, 8-phenyl-1-octylene, 9-phenyl-1-nonylene, 10-phenyl-1-decylene and 2,3-dihydro-1H-indenylene groups. Additional examples include any of these groups in which some or all of the hydrogen atoms are substituted with fluorine atoms, such as 3,3,3-trifluoropropyl and 3,3,4,4,4-pentafluorobutyl groups. $R^5$ and $R^6$ are more preferably methyl, phenyl, 3,3,3-trifluoropropyl, 2-phenyl-1-ethyl or 3-phenyl-2-propyl groups. The aryl groups and aralkyl groups may include a heteroatom on the aromatic ring.

With regard to the subscripts m, n and o, 'm' is from 0 to 20, and preferably from 4 to 10; 'n' is from 0 to 20, and preferably from 4 to 10; and 'o' is from 0 to 20, and preferably from 0 to 5. Also, the sum n+o is from 1 to 40, and especially from 1 to 10; and the sum m+n+o is from 1 to 60, and especially from 5 to 20.

Formula (2) is exemplified more specifically by the following compounds. Here, Ph stands for a phenyl group, and the subscripts m, n and o are as defined above.

[Chem. 4]

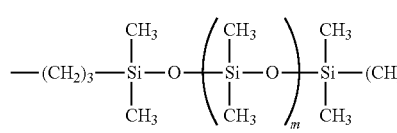 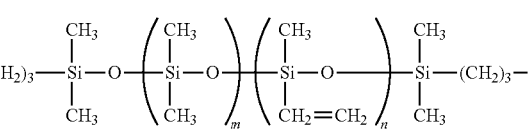

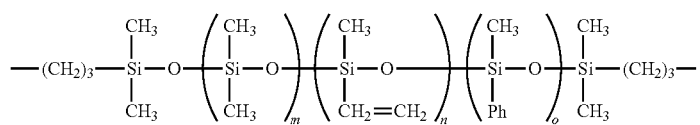

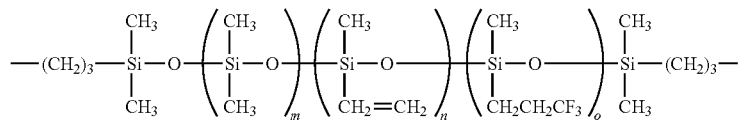

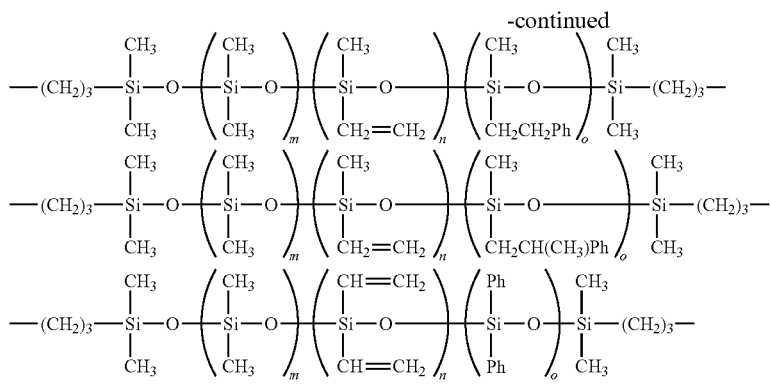

-lm-X-lm-    (3)

In formula (3), lm is a cyclic group containing on an end a cyclic imide structure, and X is a single bond (meaning that the two lm groups are linked by a single bond), an oxygen atom, a sulfur atom, a sulfide group, a sulfone group, a carbonyl group, —$NR^N$— ($R^N$ being a linear, branched or cyclic monovalent hydrocarbon group of 1 to 12 carbon atoms), —$CR^B{}_2$— (each $R^B$ being independently a hydrogen atom or a substituted or unsubstituted monovalent hydrocarbon group of 1 to 12 carbon atoms), —$R^{Ar}{}_h$— ($R^{Ar}$ being a divalent arylene group of 6 to 12 carbon atoms, and the subscript h being an integer from 1 to 6), a trivalent or tetravalent group obtained by detaching one or two hydrogen atoms from an arylene group, —$R^{Ar}{}_h(OR^{Ar})_i$— ($R^{Ar}$ and h being defined in the same way as above, and the subscript i being from 1 to 5), a linear, branched or cyclic alkylene group of 1 to 12 carbon atoms, a trivalent group obtained by detaching one hydrogen atom from the alkylene group, or a divalent to tetravalent organic group selected from among arylenealkylene groups.

The lm group in formula (3) which has a cyclic imide structure from a tetracarboxylic dianhydride is a saturated or unsaturated linear, branched or cyclic group containing on an end a cyclic imide structure. Examples include groups selected from the following formulas (wherein bond symbols with a squiggly line represent sites available for bonding (the same applies below); one or two of the sites available for bonding from cyclic carbon atoms, i.e., sites other than those on a nitrogen atom, are used to bond with another functional group X).

[Chem. 5]

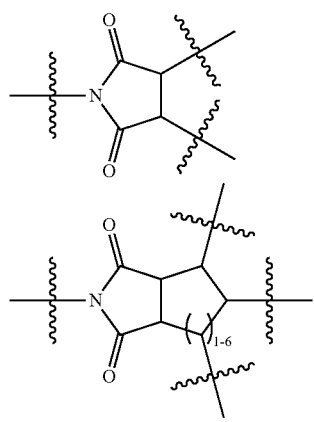

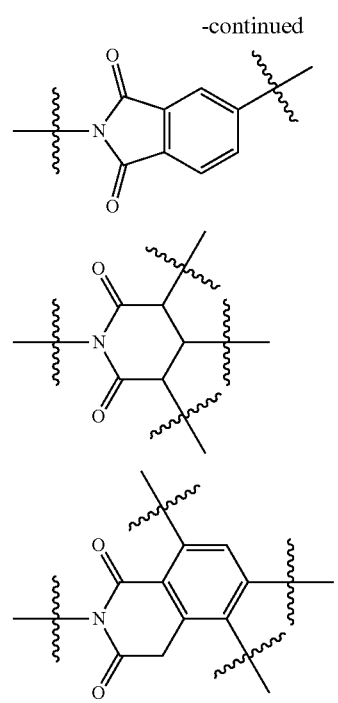

However, in cases where X in formula (3) is a single bond and may link carbon atoms on different lm groups to each other, the group is exemplified as shown below. Here, bond symbols with a squiggly line represent sites available for bonding with other groups.

[Chem. 6]

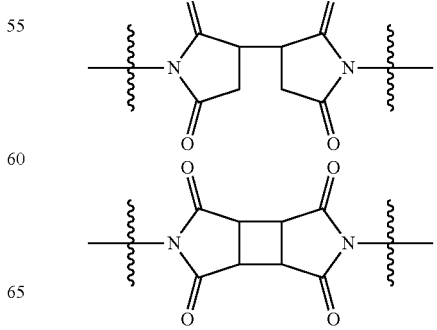

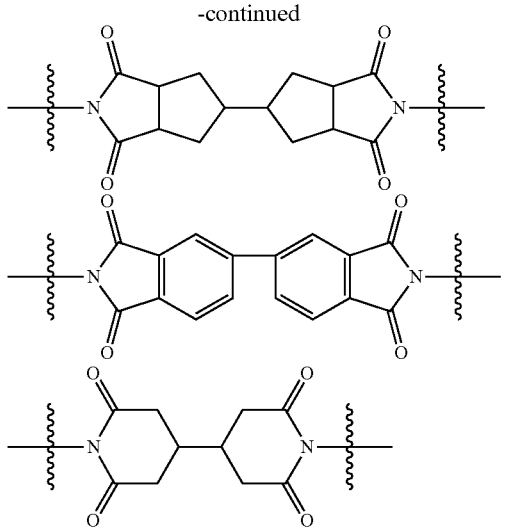

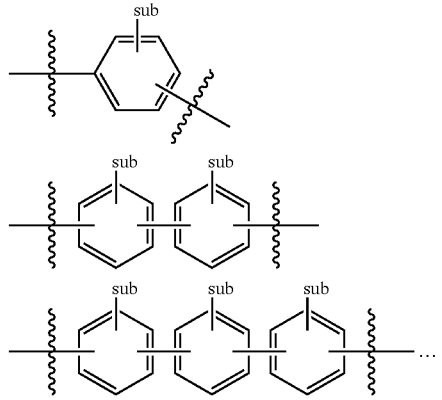

The $R^N$ group of —$NR^N$— in formula (3) is a linear, branched or cyclic monovalent hydrocarbon group of 1 to 12 carbon atoms, examples of which include alkyl groups such as methyl, ethyl, 1-propyl, 2-propyl, 1-butyl, 2-butyl, 1-pentyl, 2-pentyl, 3-pentyl, 1-hexyl, 2-hexyl, 3-hexyl, 1-heptyl, 2-heptyl, 3-heptyl, 4-heptyl, 2-methyl-1-heptyl, 1-octyl, 2-octyl, 3-octyl, 4-octyl and 2-ethyl-1-hexyl groups; aryl groups such as phenyl, 2-methylphenyl, 3-methylphenyl, 4-methylphenyl, 2,3-dimethylphenyl, 2,4-dimethylphenyl, 2,6-dimethylphenyl, 3,4-dimethylphenyl, 3,5-dimethylphenyl, 2,3,4-trimethylphenyl, 2,3,5-trimethylphenyl, 2,4,6-trimethylphenyl, indenyl, 1-naphthyl, 2-naphthyl, 1,2,3,4-tetrahydro-4H-naphth-1-yl and 1,2,3,4-tetrahydro-4H-naphth-2-yl groups; and any of these groups in which some or all of the hydrogen atoms are substituted with fluorine atoms, such as 3,3,3-trifluoropropyl, 3,3,4,4,4-pentafluorobutyl, 3,3,4,4,5,5,6,6-nonafluorohexyl, 3,3,4,4,5,5,6,6,7,7,7-undecafluoroheptyl and 3,3,4,4,5,5,6,6,7,7,8,8,8-tridecafluorooctyl groups. Methyl, phenyl and 3,3,3-trifluoropropyl groups are preferred.

In —$CR^B{}_2$— within formula (3), each $R^B$ is independently a hydrogen atom, an unsubstituted monovalent hydrocarbon group of 1 to 12 carbon atoms, or any of these groups in which some or all hydrogen atoms are substituted with fluorine atoms. Examples include alkyl groups and fluorine-substituted alkyl groups such as methyl, ethyl, propyl, trifluoromethyl, 3,3,3-trifluoropropyl and cyclohexyl groups; aralkyl groups and fluorine-substituted aralkyl groups such as ($CH_2CH_2C_6H_5$) and ($CH_2CH_2C_6F_5$); and aryl groups and fluorine-substituted aryl groups such as phenyl, naphthyl and perfluorophenyl groups. Preferred examples include hydrogen atoms, methyl groups, trifluoromethyl groups and phenyl groups.

In —$R^{Ar}{}_h$— within formula (3), $R^{Ar}$ is an unsubstituted divalent arylene group of 6 to 12 carbon atoms in which some or all hydrogen atoms on the skeleton may be substituted with fluorine atoms and some of the carbon atoms on the skeleton may be substituted with heteroatoms. More preferred examples of $R^{Ar}$ include the groups shown below. In the formulas, "sub" represents a hydrogen atom or a substituent selected from among hydroxyl, sulfide, 2,3-oxo-1-propyl, methoxy, ethoxy, t-butoxy, methyl, ethyl, propyl, t-butyl, N,N-dimethylamino, cyano, methoxycarbonyl, ethoxycarbonyl, formyl, methylcarbonyl, ethylcarbonyl and fluorine atoms. The number of substitutions is within the range of 1 to 4.

Also, the subscript h is an integer from 1 to 6. Moreover, $R^{Ar}$ here and Im may be linked at one place or may be linked directly at two places on Im. Examples include the following groups.

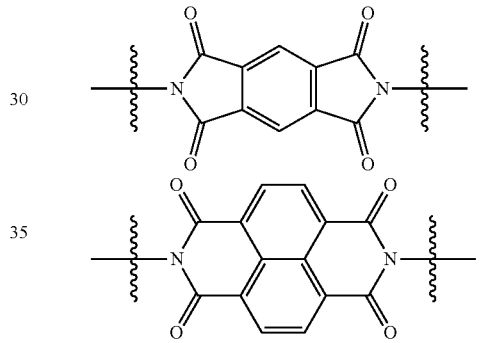

In —$R^{Ar}{}_h(OR^{Ar})_i$— within formula (3), $R^{Ar}$ and h are as defined above, and the subscript i is an integer from 1 to 5. Examples include the groups shown below. Here, —O— may be bonded at any position, and the number of bonds is in the range of 1 to 4.

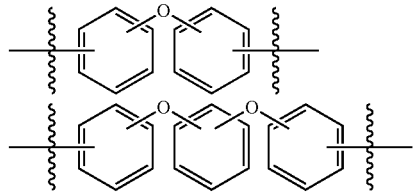

In the linear, branched or cyclic alkylene groups of 1 to 8 carbon atoms, trivalent groups obtained by detaching one hydrogen atom from the alkylene groups, and divalent arylenealkylene groups of 6 to 12 carbon atoms, some of the hydrogen atoms may be substituted with monovalent alkyl groups of 1 to 6 carbon atoms, monovalent aryl groups of 5 to 12 carbon atoms or fluorine atoms, and some of the skeletal carbon atoms may be substituted with heteroatoms. Examples include the following groups.

[Chem. 10]

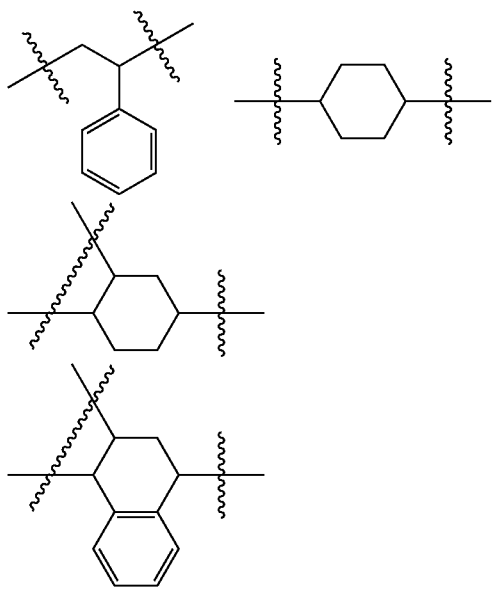

It is preferable for the divalent residue from a diamine serving as G in formula (1) to be a compound which has a low light absorption in the ultraviolet to visible range and does not easily form a charge transfer complex following imidazation. An aliphatic diamine is preferable in terms of not hindering light absorption, although an aromatic diamine having an even better heat resistance may be used insofar as it does not hinder light absorption by the photopolymerization initiator. Examples of aliphatic diamines include tetramethylenediamine, 1,4-diaminocyclohexane and 4,4'-diaminodicyclohexylmethane. Examples of aromatic diamines include phenylenediamine, 4,4'-diaminodiphenyl ether, 2,2-bis(4-aminophenyl)propane and 2,2-bis[4-(4-aminophenoxy)phenyl]propane. These may be used singly or two or more may be used in combination.

The recurring units of E or G are randomly bonded to F in formula (1). In this case, the end of the compound of formula (1) is preferably capped with an acid anhydride. Also, the molar sum of f+e+g is 100 mol %, and the molar ratio f/(e+g) is from 0.8 to 1.2, and preferably from 0.95 to 1.05.

The weight-average molecular weight of the silicone-modified polyimide resin of component (A) is from 5,000 to 100,000, and preferably from 10,000 to 70,000. When the molecular weight is below the lower limit value, the film obtained by curing the silicone-modified polyimide resin-containing composition becomes brittle, and when it exceeds the upper limit value, the compatibility with the polymerizable compound (B) and the polymerization initiator (C) serving as other ingredients tends to worsen. Here and below, the weight-average molecular weight can be determined, for example, as the polystyrene equivalent by gel permeation chromatography (sometimes abbreviated below as GPC) using tetrahydrofuran (THF) as the mobile phase.

Preparation of component (A) may be carried out according to a known method. First, a tetracarboxylic dianhydride, a diamine and a diamino-modified silicone are charged into a solvent and reacted at a low temperature, i.e., at from about 20° C. to about 50° C., thereby forming polyamic acid as the precursor of the polyimide resin. Next, the temperature of the resulting polyamic acid solution is raised to preferably from 80 to 200° C., and more preferably from 140 to 180° C., and the acid amide of the polyamic acid is subjected to dehydrative ring closure, thereby giving a silicone-modified polyimide resin solution. This solution is then poured into a solvent such as water, methanol, ethanol or acetonitrile and thereby precipitated. By drying the precipitate, a silicone-modified polyimide resin can be obtained.

In this case, it is preferable for the tetracarboxylic dianhydride that is used to be one in which the unsaturated bonds are not conjugated with carbonyl groups. Also, the diamino-modified silicone that is used may be one in which amino groups are respectively bonded at both ends in formula (2) above. One of the diamines mentioned above is preferably used as the diamine.

Here, f/(e+g) is the ratio of the combined number of moles of diamine and diamino-modified silicone to the number of moles of tetracarboxylic dianhydride. That is, the ratio [(diamine+diamino-modified silicone (moles))/tetracarboxylic dianhydride (moles)] can be suitably adjusted, but is in the range of 0.8 to 1.2, preferably 0.95 to 1.05, and more preferably 0.98 to 1.02. Examples of solvents that can be used when preparing component (A) include N-methyl-2-pyrrolidone, cyclohexanone, γ-butyrolactone and N,N-dimethylacetamide. By concomitantly using an aromatic hydrocarbon such as toluene or xylene, it is also possible to facilitate azeotropic removal of the water formed during imidazation. These solvents may be of one type used alone or a combination of two or more solvents.

To adjust the molecular weight of the silicone-modified polyimide resin, it is possible to add also a monofunctional starting material that is an acid anhydride, such as phthalic anhydride, maleic anhydride, hexahydro-1,3-isobenzofurandione, succinic anhydride, glutaric anhydride or an acid anhydride-modified silicone having from 10 to 60 silicon atoms, or an amine compound such as a linear, branched or cyclic alkylamine of 3 to 6 carbon atoms, examples of which include aniline, benzylamine, propylamine, butylamine, pentylamine, hexylamine and cyclohexylamine. Also, aldehyde compounds containing from 2 to 6 carbon atoms, such as benzaldehyde, phenylacetaldehyde, propionaldehyde and butyraldehyde, may be added as aldehyde compounds. The amount of addition in this case is preferably not more than 2 mol % based on the silicone-modified polyimide resin.

Use can be made of a method which, in the imidazation step, induces imidazation by adding a dehydrating agent and an imidazation catalyst and optionally heating to about 50° C. In this method, an acid anhydride such as acetic anhydride, propionic anhydride, pivalic anhydride, trifluoroacetic anhydride and benzoic anhydride may be used as the dehydrating agent. The amount of dehydrating agent used is preferably set to from 1 to 10 moles per mole of diamine. The imidazation catalyst used may be a tertiary amine, such as triethylamine ($Et_3N$), diisopropylethylamine (DIPEA), tri-n-butylamine, tri-n-pentylamine, tri-n-hexylamine, tri-n-heptylamine, tri-n-octylamine, N-methylpyrrolidine, N-methylpiperazine, N-methylmorpholine, N,N,N',N'-tetramethylethylenediamine (TMEDA), N-methylimidazole (NMI), pyridine, 2,6-lutidine, 1,3,5-collidine, N,N-dimethylaminopyridine, pyrazine, quinoline, 1,8-diazabicyclo[5.4.0]-7-undecene (DBU) or 1,4-diazabicyclo[2.2.2]octane (DABCO). The amount of imidazation catalyst used is preferably set to from 0.5 to 10 moles per mole of the dehydrating agent used. This imidazation technique does not involve exposing the reaction mixture to a high temperature during the operation, and thus is effective in that the resin obtained does not readily discolor.

Even in cases where at least a plurality of diamines or a plurality of tetracarboxylic dianhydrides are used, the reaction method is not particularly limited and may be, for example, one in which the starting materials are all mixed together beforehand, after which copolycondensation is effected, or one in which the two or more diamines or tetracarboxylic dianhydrides to be used are separately and successively added while effecting the reaction.

—(B) Polymerizable Compound—

Component (B) of the invention is a radical polymerizable compound, specifically at least one compound selected from among (meth)acrylic acid derivatives, alkenyl compounds, cycloalkenyl compounds, alkynyl compounds, styryl compounds, indenyl compounds, vinyl ether compounds, norbornyl compounds and conjugated or unconjugated alkadiene compounds. A portion of the hydrogen atoms thereon may be substituted with fluorine atoms, and a portion of the carbon atoms may be substituted with oxygen atoms.

The (meth)acrylic acid derivative can be represented by general formula (4) or (5) below. Here, general formula (4) indicates a (meth)acrylate ester compound, and general formula (5) indicates a (meth)acrylamide compound. A portion of the hydrogen atoms may be substituted with linear, branched or cyclic alkyl groups of 1 to 16 carbon atoms and/or siloxanyl groups of 2 to 60 silicon atoms.

$$CH_2=CR^7C(=O)OR^8 \quad (4)$$

$$CH_2=CR^7C(=O)NR^8_2 \quad (5)$$

Here, $R^7$ is a linear or branched alkyl group of 1 to 10 carbon atoms, and $R^8$ is a linear, branched or cyclic alkyl group of 1 to 16 carbon atoms; these may include a siloxanyl group of 2 to 60 silicon atoms. As used in this specification, "(meth)acryl" signifies both acrylic and methacrylic groups.

The compound of general formula (4) is, for example, methyl (meth)acrylate, ethyl (meth)acrylate, propyl (meth) acrylate, butyl (meth)acrylate, t-butyl (meth)acrylate, isobutyl (meth)acrylate, pentyl (meth)acrylate, hexyl (meth)acrylate, heptyl (meth)acrylate, norbornyl (meth)acrylate, isobornyl (meth)acrylate, octyl (meth)acrylate, nonyl (meth) acrylate, decyl (meth)acrylate, undecyl (meth)acrylate, methyl (meth)acrylate, dodecyl (meth)acrylate, tridecyl (meth)acrylate, tetradecyl (meth)acrylate, pentadecyl (meth) acrylate, hexadecyl (meth)acrylate, 2-ethylhexyl (meth) acrylate, cyclopentyl, cyclohexyl, cycloheptyl, cyclooctyl or 3,3,3-trifluoropropyl (meth)acrylate, 3,3,4,4,4-pentafluorobutyl (meth)acrylate, 3,3,4,4,5,5,6,6,6-nonafluorohexyl (meth)acrylate, 3,3,4,4,5,5,6,6,7,7,7-undecafluoroheptyl (meth)acrylate, 3,3,4,4,5,5,6,6,7,7,8,8,8-tridecafluorooctyl (meth)acrylate, 2-methoxyethyl (meth)acrylate, 2-(2-methoxyethoxy)ethyl (meth)acrylate, 2-(2-(2-methoxyethoxy)ethoxy)ethyl (meth)acrylate, 2-(2-(2-(2-methoxyethoxy)ethoxy)ethoxy)ethyl (meth)acrylate, 2-(2-(2-(2-(2-methoxyethoxy)ethoxy)ethoxy)ethoxy)ethyl (meth)acrylate, 3-methoxypropyl (meth)acrylate, 3-(3-methoxypropoxy) propyl (meth)acrylate, 3-(3-(3-methoxypropoxy)propoxy) propyl (meth)acrylate, 3-(3-(3-(3-methoxypropoxy) propoxy)propoxy)propyl (meth)acrylate, 3-(3-(3-(3-(3-methoxypropoxy)propoxy)propoxy)propoxy)propyl (meth) acrylate, 2-methoxy-1-propyl (meth)acrylate, 2-(2-methoxy-1-propoxy)-1-propyl (meth)acrylate, 2-(2-(2-methoxy-1-propoxy)-1-propoxy)-1-propyl (meth)acrylate, 2-(2-(2-(2-methoxy-1-propoxy)-1-propoxy)-1-propoxy)-propyl (meth)acrylate, 2-(2-(2-(2-(2-methoxy-1-propoxy)-1-propoxy)-1-propoxy)-1-propoxy)-1-propyl (meth)acrylate, 2-hydroxyethyl (meth)acrylate, 2-(2-hydroxyethoxy) ethyl (meth)acrylate, glyceryl (meth)acrylate, 2,3-oxopropyl (meth)acrylate, 3,4-oxocyclohexylmethyl (meth)acrylate, (meth)acryloxypropyltrimethoxysilane, (meth)acryloxypropylmethyldimethoxysilane, or a silicone-modified (meth) acrylate ester compound containing from 2 to 60 dimethylsiloxane units. Additional examples include 3-substituted-1-propyl (meth)acrylate and 3-(trimethylsiloxysilyl)-1-propyl (meth)acrylate.

Examples of the (meth)acrylamide of general formula (5) include (meth)acrylamide, N,N-dimethyl (meth)acrylamide, N,N-diethyl (meth)acrylamide, N-isopropyl (meth)acrylamide, morpholyl (meth)acrylate, N-methoxyethyl (meth)acrylamide and N-(2-hydroxyethyl) (meth)acrylamide.

The above (meth)acrylic acid derivatives are monofunctional compounds, although a polyfunctional (meth)acrylic acid compound may also be added to enhance strength and adhesion. Examples include polyfunctional (meth)acrylate ester compounds such as ethylene glycol di(meth)acrylate, diethylene glycol di(meth)acrylate, triethylene glycol di(meth)acrylate, tetraethylene glycol di(meth)acrylate, glyceryl tris(meth)acrylate, pentaerythritol tetrakis(meth)acrylate and trimethylolpropane tris(meth)acrylate; and bis(meth) acrylamide compound derivatives such as N,N'-ethylenebis (meth)acrylamide and N,N'-propylenebis (meth)acrylamide. Silicone-containing crosslinkable components may also be used. Specific examples include the X-22-164 series, X-22-2445 and X-22-1602 from Shin-Etsu Chemical Co., Ltd.

Examples of alkenyl compounds include propene, hexene, heptene, octene, nonene and decene. Examples of cycloalkenyl compounds include cyclopentene, cyclohexene, cycloheptene, cyclooctene and menthene. Examples of alkynyl compounds include acetylene, propyne, butyne and pentyne. A portion of the hydrogen atoms may be substituted with siloxanyl groups of 2 to 60 silicone atoms. Examples include ethyne compounds and 4-siloxanyl-1-butyne compounds having from 2 to 60 dimethylsiloxane units.

Examples of styryl compounds include styrene, α-methylstyrene, β-methylstyrene, and styrene derivatives which are substituted at the o position, m position or p position with a hydrocarbon group of 1 to 6 carbon atoms that may include an oxygen or nitrogen atom on the group. Examples of indenyl derivatives include indene, 1-methyl indene and 1,3-bis(3-indenyl)ethane.

Vinyl ether compounds are represented as $CH_2=CHOR^9$. Here, examples of $R^9$ include, without particular limitation, butyl, heptyl, octyl, nonyl, decyl, 2-methoxyethyl, 2-(2-methoxyethoxy)ethyl, 2-(2-(2-methoxyethoxy)ethoxy) ethyl, 2-(2-(2-(2-methoxyethoxy)ethoxy)ethoxy)ethyl and 2-(2-(2-(2-(2-methoxyethoxy)ethoxy)ethoxy)ethoxy)ethyl groups.

Examples of norbornyl compounds include norbornene and norbornene having substituents.

Examples of conjugated or unconjugated alkadienes include butadiene, 1,3-pentadiene, 1,4-pentadiene, 1,3-hexadiene, 1,5-hexadiene, 1,3-octadiene and 1,7-octadiene.

Component (B) is admixed as a reaction diluent for component (A); use may be made of one type alone or of two or more types. (Meth)acrylate ester compounds and (meth) acrylamide compounds are more preferred in terms of availability.

The content of component (B) per 100 parts by weight of component (A) is from 100 to 2,000 parts by weight, and preferably from 100 to 500 parts by weight. At a content of less than 100 parts by weight, the curability worsens and the storage modulus decreases, whereas at more than 2,000 parts by weight, the viscosity decreases and the storage modulus rises excessively.

—(C) Polymerization Initiator—

The polymerization initiator serving as component (C) of the invention is a thermally decomposing radical initiator or a radiation-activated initiator. An azo compound or an organic peroxide may be used as the thermally decomposing radical initiator. In this case, the cured product can be formed by inducing radical polymerization with heat.

Azo compounds (organic azo compounds) that may be preferably used include azonitrile compounds such as V-30, V-40, V-59, V-60, V-65 and V-70, azoamide compounds such as VA-080, VA-085, VA-086, VF-096, VAm-110 and VAm-111, cyclic azoamidine compounds such as VA-044 and VA-061, and azoamidine compounds such as V-50 and VA-057, all of which are sold by Wako Pure Chemical Industries, Ltd.; and also 2,2-azobis(4-methoxy-2,4-dimethylvaleronitrile), 2,2-azobis(2,4-dimethylvaleronitrile), 2,2-azobis(2-methylpropionitrile), 2,2-azobis(2,4-dimethylbutyronitrile), 1,1-azobis(cyclohexane-1-carbonitrile), 1-[(1-cyano-1-methylethyl)azo]formamide, 2,2-azobis{2-methyl-N-[1,1-bis(hydroxymethyl)-2-hydroxyethyl]propionamide}, 2,2-azobis[2-methyl-N-(2-hydroxybutyl)propionamide], 2,2-azobis[N-(2-propenyl)-2-methylpropionamide], 2,2-azobis(N-butyl-2-methylpropionamide), 2,2-azobis(N-cyclohexyl-2-methylpropionamide), 2,2-azobis[2-(2-lmidazolin-2-yl)propane] dihydrochloride, 2,2-azobis[2-(2-lmidazolin-2-yl)propane] disulfate dihydrate, 2,2-azobis{2-[1-(2-hydroxyethyl)-2-lmidazolin-2-yl]propane} dihydrochloride, 2,2-azobis[2-(2-lmidazolin-2-yl)propane], 2,2-azobis(1-lmino-1-pyrrolidino-2-methylpropane) dihydrochloride, 2,2-azobis(2-methylpropionamidine) dihydrochloride, 2,2-azobis[N-(2-carboxyethyl)-2-methylpropionamidine] tetrahydrate, dimethyl-2,2-azobis(2-methylpropionate), 4,4-azobis(4-cyanovaleric acid) and 2,2-azobis(2,4,4-trimethylpentane). V-30, V-40, V-59, V-60, V-65, V-70, VA-080, VA-085, VA-086, VF-096, VAm-110 and VAm-111 are more preferred; and V-30, V-40, V-59, V-60, V-65 and V-70 are especially preferred.

Organic peroxides that may be preferably used include ketone peroxides such as Perhexa H, peroxyketals such as Perhexa TMH, hydroperoxides such as Perbutyl H-69, dialkyl peroxides such as Percumyl D, Perbutyl C and Perbutyl D, diacyl peroxides such as Niper BW, peroxyesters such as Perbutyl Z and Perbutyl L, and peroxy dicarbonates such as Peroyl TCP, all of which are sold by NOF Corporation; and also diisobutyryl peroxide, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, di(4-t-butylcyclohexyl) peroxydicarbonate, di(2-ethylhexyl) peroxydicarbonate, t-hexyl peroxyneodecanoate, t-butyl peroxyneodecanoate, t-butyl peroxyneoheptanoate, t-hexyl peroxypivalate, t-butyl peroxypivalate, di(3,5,5-trimethylhexanoyl) peroxide, dilauroyl peroxide, 1,1,3,3-tetramethylbutylperoxy-2-ethyl hexanoate, disuccinic acid peroxide, 2,5-dimethyl-2,5-di(2-ethylhexanoylperoxy)hexane, t-hexylperoxy-2-ethyl hexanoate, di(4-methylbenzoyl) peroxide, t-butylperoxy-2-ethyl hexanoate, di(3-methylbenzoyl) peroxide, benzoyl(3-methylbenzoyl) peroxide, dibenzoyl peroxide, dibenzoyl peroxide, 1,1-di(t-butylperoxy)-2-methylcyclohexane, 1,1-di(t-hexylperoxy)-3,3,5-trimethylcyclohexane, 1,1-di(t-hexylperoxy)cyclohexane, 1,1-di(t-butylperoxy)cyclohexane, 2,2-di[4,4-di-(t-butylperoxy)cyclohexyl]propane, t-hexylperoxy isopropyl monocarbonate, t-butylperoxymaleic acid, t-butylperoxy-3,5,5-trimethyl hexanoate, t-butylperoxylaurate, t-butylperoxyisopropyl monocarbonate, t-butylperoxy-2-ethylhexyl monocarbonate, t-hexylperoxybenzoate, 2,5-dimethyl-2,5-di(benzoylperoxy)hexane, t-butylperoxyacetate, 2,2-di(t-butylperoxy)butane, t-butylperoxybenzoate, n-butyl-4,4-di-t-butylperoxyvalerate, di(2-t-butylperoxyisopropyl)benzene, dicumyl peroxide, di-t-hexyl peroxide, 2,5-dimethyl-2,5-di(t-butylperoxy)hexane, t-butylcumyl peroxide, di-t-butyl peroxide, p-methane hydroperoxide, 2,5-dimethyl-2,5-di(t-butylperoxy)hexan-3-yne, di isopropylbenzene hydroperoxide, 1,1,3,3-tetramethylbutyl hydroperoxide, cumene hydroperoxide, t-butylhydroperoxide, 2,4-dichlorobenzoyl peroxide, o-chlorobenzoyl peroxide, p-chlorobenzoyl peroxide, tris(t-butylperoxy)triazine, 2,4,4-trimethylpentyl peroxyneodecanoate, a-cumyl peroxyneodecanoate, t-amyl peroxy-2-ethylhexanoate, t-butyl peroxyisobutyrate, di-t-butyl peroxyhexahydroterephthalate, di-t-butyl peroxytrimethyladipate, di-3-methoxybutyl peroxydicarbonate, diisopropyl peroxydicarbonate, t-butyl peroxyisopropylcarbonate, 1,6-bis(t-butyl peroxycarbonyloxy)hexane, diethylene glycol bis(t-butylperoxycarbonate) and t-hexyl peroxyneodecanoate. Percumyl D, Perbutyl C and Perbutyl D are more preferred. Percumyl D is especially preferred.

In the case of radiation-activated initiators, those activated by infrared light, visible light, ultraviolet light, x-rays, electron beams, α-rays, β-rays or γ-rays are more preferred, and those activated by ultraviolet light or visible light are even more preferred.

Ultraviolet-visible light-activated initiators may be used singly or a plurality may be used in admixture. When used singly, illustrative examples include 1-hydroxycyclohexyl phenyl ketone, 2,2-dimethoxy-2-phenyl acetophenone, benzoin isobutyl ether, xanthone, fluorenone, benzaldehyde, fluorene, anthraquinone, triphenylamine, carbazole, 3-methy lacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one (Irgacure 1173), 2-hydroxy-1-[4-(2-hydroxyethoxy)phenyl]-2-methyl-1-propanone, 2-benzyl-2-dimethylamino-1-(4-morpholinophenyl)butan-1-one (Irgacure 369), 2-dimethylamino-2-(4-methylbenz)-1-(4-morpholin-4-ylphenyl)butan-1-one, diethoxyacetophenone, thioxanthone, diethylthioxanthone, 2-isopropylthioxanthone, 2-chlorothioxanthone, 2-methyl-1-[4-(methylthio)phenyl]-2-morpholinopropan-1-one, 2,4,6-trimethylbenzoyldiphenylphosphine oxide (Irgacure TPO), bis(2,4,6-trimethylbenzoyl)phenylphosphine oxide (Irgacure 819) and bis(2,6-dimethoxybenzoyl)-2,4,4-trimethylpentylphosphine oxide.

When a plurality of initiators are mixed and used together, they may be included so as to complement each other in the ultraviolet-visible light absorption spectrum or may be included while taking into account oxygen inhibition. In such cases, it is desirable to add the required amount of a benzophenone system such as 2-hydroxy-2-methyl-1-phenylpropan-1-one and 2,2-dimethoxy-1,2-diphenylethan-1-one, 1-hydroxycyclohexyl phenyl ketene, or a mixture of 1-hydroxycyclohexyl phenyl ketene and benzophenone to a phosphine oxide system such as bis(2,4,6-trimethylbenzoyl)phenyl phosphine oxide or bis(2,4,6-trimethylbenzoyl)phenyl phosphine oxide.

The component (C) content per 100 parts by weight of component (A) is from 0.1 to 30 parts by weight, and preferably from 1 to 10 parts by weight. At a content of less than 0.1 part by weight, the curability is inadequate; at a content greater than 30 parts by weight, considerable outgassing from the initiator arises and cure shrinkage occurs.

—(D) Hydrophobic Fumed Silica—

The hydrophobic fumed silica serving as component (D) is essential for preventing liquid sag, preventing air bubble entrainment and unevenness during application, exhibiting thixotropy that maintains moldability, and exhibiting a low elastic modulus that suppresses increased hardness of the cured product. The use of dry hydrophobic fumed silica (dry silica) is preferred. For the above purposes, a bulk density lower than 1 g/mL is preferred; at a bulk density higher than 1 g/mL, silica precipitates during preparation. The average primary particle size is preferably from 1 to 100 nm. At an average primary particle size in this range, light scattering by fumed silica in the solventless silicone-modified polyimide-containing cured composition can be suppressed, and so there is no loss in the transparency of the cured product. This average particle size can be determined as a weight-average value (or median value) with a particle size analyzer that uses an analytic technique such as laser light diffraction analysis. For example, measurement may be carried out with the VHX-5000 Digital Microscope from Keyence Corporation. The BET specific surface area is preferably from 100 to 300 m²/g.

The fumed silica of component (D) is a finely powdered silica, especially a dry silica produced by hydrolyzing a silicon halide in an oxyhydrogen flame, that has hitherto been used as a thickener or thixotropic agent to increase the workability of adhesives used in structural, industrial, household and other applications. The use of such a finely powdered silica is disclosed in, for example, JP-A H4-25588, JP-A H4-28755, JP-A H4-33916, and in the Degussa catalog "AEROSIL für loesemittelfreie Epoxyidharze" (Degussa AG Schriftenreihe Pigmente No. 27). Examples of commercial products include the hydrophobic dry silica surface-treated with hexamethyldisilazane available under the trade name AEROSIL R8200 from Nippon Aerosil Co., Ltd. (specific surface area, 160 m²/g; amount of adsorbed carbon, 3.0 wt %; bulk density, 0.14 g/mL), the hydrophobic dry silica surface-treated with hexamethyldisilazane available under the trade name AEROSIL RX200 from Nippon Aerosil Co., Ltd. (specific surface area, 140 m²/g; amount of adsorbed carbon, 2.3 wt %; bulk density, 0.05 g/mL), the surface-treated hydrophobic dry fumed silica available under the trade name Reolosil DM-10 from Tokuyama Corporation (specific surface area, 190 m²/g; bulk density, 0.05 g/mL; average primary particle size, 15 nm), the surface-treated hydrophobic dry fumed silica available under the trade name Reolosil DM-30 from Tokuyama Corporation (specific surface area, 230 m²/g; bulk density, 0.05 g/mL; average primary particle size, 7 nm), the surface-treated hydrophobic dry fumed silica available under the trade name Reolosil DM-30S from Tokuyama Corporation (specific surface area, 230 m²/g; bulk density, 0.05 g/mL; average primary particle size, 7 nm), and the surface-treated hydrophobic dry fumed silicas available under the trade names Reolosil DM-30S (Tokuyama Corporation; specific surface area, 230 m²/g; bulk density, 0.05 g/mL; average primary particle size, 7 nm), Reolosil HM20S (Tokuyama Corporation; average primary particle size, 12 nm), Reolosil HM30S (Tokuyama Corporation; average primary particle size, 7 nm), Reolosil HM40S (Tokuyama Corporation; average primary particle size, 7 nm) and Reolosil ZD30S (Tokuyama Corporation; average primary particle size, 7 nm).

The content of component (D) per 100 parts by weight of (A) is from 1 to 50 parts by weight, preferably from 3 to 30 parts by weight, and more preferably from 5 to 20 parts by weight. At a content below 1 part by weight, the viscosity becomes too low and the thickening properties and thixotropy decline. At more than 50 parts by weight, the composition loses flowability and has a poor workability.

The solventless silicone-modified polyimide-containing composition of the invention is prepared by a method that includes the step of dissolving the silicone-modified polyimide resin (A) in the polymerizable compound (B) to obtain a silicone-modified polyimide-polymerization compound solution, and the step of adding the polymerizable initiator (C) and the fumed silica (D) to this silicone-modified polyimide-polymerizable compound solution, and then stirring and mixing to obtain a solventless silicone-modified polyimide resin composition.

The solventless silicone-modified polyimide-containing composition of the invention has a viscosity that differs according to the intended use. However, taking into account the handleability, it is preferable for the composition to have flowability at 25° C. and for the viscosity at 25° C. to be from 3 to 1,000 Pa·s, and especially from 8 to 150 Pa·s. At below 3 Pa·s, the composition spreads during application, making application over the intended surface area difficult. At above 1,000 Pa·s, the flowability at 25° C. decreases, problems such as air bubble entry and unevenness tend to arise during application, and the extrudability with a syringe or the like worsens.

A modifying additive (H) may be added to the solventless silicone-modified polyimide-containing composition of the invention. This is exemplified by siloxane-modified (meth)acrylates and epoxy group-containing compounds. Specific examples include the X-22-174 series (X-22-174ASX, X-22-174DX) and X-22-2404, all from Shin-Etsu Chemical Co., Ltd.

The amount of component (H) added per 100 parts of components (A) and (B) combined is preferably from 0 to 20 parts by weight; when component (H) is included, the amount thereof is typically 5 parts or more. When more than 10 parts by weight of the siloxane-modified (meth)acrylate is added, the bonding properties and adhesion worsen; when more than 20 parts by weight of the epoxy group-containing compound is added, the storage modulus rises and the film becomes hard.

In addition, a siloxane-type leveling agent (I) may be added to the composition. Siloxane-type leveling agents are exemplified by those of formula (6). With the addition of a siloxane-type compound, especially a (meth)acrylic acid-modified silicone, the surface smoothness and coefficient of kinetic friction decrease.

[Chem. 11]

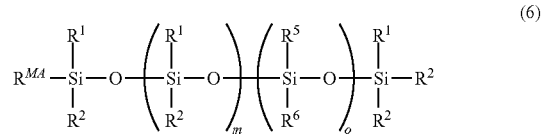

(6)

In formula (6), $R^{MA}$ is a monovalent hydrocarbon group containing a (meth)acryl group. $R^1$, $R^2$, $R^5$, $R^6$, m and o are as defined above, although the sum of m and o is an integer from 3 to 40. The respective recurring units have a randomly bonded arrangement.

A compound of formula (7) is more preferred.

[Chem. 12]

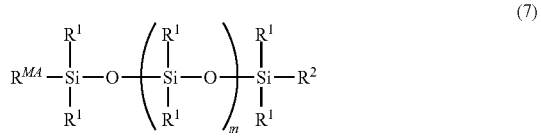

(7)

In formula (7), $R^{MA}$, $R^1$, $R^2$ and m are as defined above.

Specific examples include the X-22-174 series (X-22-174ASX, X-22-174DX) and X-22-2404, all from Shin-Etsu Chemical Co., Ltd.

The content of (I) per 100 parts by weight of the composition of components (A) to (D) is preferably from 1 to 20 parts by weight, and more preferably from 5 to 10 parts by weight. At less than 1 part by weight, the advantageous effects do not appear; at more than 20 parts by weight, phase separation with the siloxane components arises.

A dye (J) may also be added to the composition. Adding a dye enables the visibility following application to be increased. By adding a dye to the composition and stirring/mixing, a colored solventless silicone-modified polyimide resin composition can be obtained.

A colored colorant may be used as the dye. Illustrative examples include azo, phthalocyanine, dioxazine, quinacridone, anthraquinone, perinone, perylene, thioindigo, isoindolinone, quinophthalone, azomethineazo, diketopyrrolopyrrole and isoindoline pigments. These colorants may be used singly, or two or more may be used together.

In order for the dye to manifest a sufficient intensity and tinting strength, it is preferably included in an amount of from 0.1 to 10 wt % with respect to the overall weight of the silicone-modified polyimide resin-containing composition. When the amount of dye added is too large, problems such as leaching arise.

To minimize problems such as leaching, a good solution is to use the RDW series of polymerizable dyes from Wako Pure Chemical Industries, Ltd. Preparation may be carried out by adding a polymerizable dye to the solventless silicone-modified polyimide resin composition and stirring and mixing. Examples of such polymerizable dyes include RDW-R13 (violet), RDW-R60 (red), RDW-Y03 (yellow), RDW-G01 (green) and RDW-B01 (blue). The amount of polymerizable dye used can be set to from 0.001 to 0.1 wt %, based on the silicone-modified polyimide-containing composition.

The solventless silicone-modified polyimide-containing composition of the invention is a solventless silicone-modified polyimide-containing composition having in the L*a*b* color space, as determined with a color difference meter, an L* value larger than 0, an a* value in the range of −10 to 10, and a b* value in the range of −10 to 10.

When the inventive composition is cured with ultraviolet light or visible light, the use of light having a wavelength of from 200 to 750 nm, especially ultraviolet light at 220 to 380 nm or visible light at 380 to 500 nm, is preferred. The dose is preferably from 1 to 5,000 mJ/m², and more preferably from 500 to 2,000 mJ/m².

It is preferable for the film obtained by curing the inventive composition with ultraviolet light and/or visible light to have a storage modulus of from 1 MPa and up to 500 MPa, to have a light transmittance at wavelengths in the visible light spectrum of at least 80%, and to have, in the L*a*b* color space, an L* value of at least 80, an a* value of at least from −10 and less then 10and a b* value of at least −10 and less than 10.

The solventless silicone-modified polyimide resin composition of the invention can be used as an ultraviolet and/or visible light-curable adhesive or as a coating agent that is cured with ultraviolet and/or visible light. Substrates for the adhesive or substrates that can be coated are exemplified by inorganic materials, including metals such as iron, copper, nickel and aluminum, and glass; and organic resins such as epoxy resins, acrylic resins, polycarbonate resins, PET resins and LCP resins.

Adhesives or coating agents that use the solventless silicone-modified polyimide resin composition of the invention may be employed in electronic materials, optical materials, and vehicle mounted equipment.

EXAMPLES

The invention is illustrated more fully below by way of Synthesis Examples and Working Examples. However, the invention is not limited by these Examples and may also be practiced with suitable variations thereto, all such variations falling within the technical scope of the invention. In the Examples below, parts are indicated by weight.

In these Examples, molecular weight measurement was carried out against a polystyrene standard with a gel permeation chromatography (GPC) system from Tosoh Corporation and using tetrahydrofuran (THF) as the mobile phase. The infrared absorption spectrum (IR) was measured using the NICOLET 6700 (Thermo Fisher Scientific KK). Measurement of the L*a*b* color space was carried out using the CM-5 Spectrophotometer from Konica Minolta, Inc. The viscoelastic properties of the cured film were measured using the DMS 6100 from Hitachi High-Tech Science Corporation (formerly, Seiko Instruments, Inc.).

<Measurement of Die Shear Strength>

A sample was produced by applying a small amount of the composition shown in Tables onto a substrate, placing a round cylinder (diameter, 3 mm) on top thereof and lightly pressing this together with the substrate, followed by irradiation with 2,000 mJ/cm² of ultraviolet light from a metal halogen lamp. The die shear strength of the sample was measured using a universal bond tester (4000 Series, from Dage).

<Cross-Cut Peel Test Method>

A silicone-modified polyimide resin-containing composition was applied to a thickness of 1 mm onto a glass plate and UV irradiated (cumulative dose, 2,000 mJ/m²) using a metal-halide lamp, thereby obtaining a cured film. This was exposed for 24 hours under high-temperature, high-humidity conditions (80° C./95% RH), and adhesion to the glass plate before exposure and after exposure was evaluated by the cross-cut peel test (JIS K5400) method.

Synthesis Example 1

A reactor equipped with a stirrer, a thermometer and a nitrogen inlet was charged with 30.0 g (0.1 mol) of 5-(2,4-dioxacyclopentyl)-3a,4,5,9b-tetrahydronaphtho[1,2-c]furan-1,3-dione, 250 g of N,N-dimethylacetamide and 100 g of toluene, following which 10.3 g (0.025 mol) of 2,2-bis[4-(4-aminophenoxy)phenyl]propane was added and the reaction temperature was held at 50° C. for 3 hours. Also, 66.6 g (0.075 mol) of the siloxane of formula (i) below was added dropwise at room temperature. Following the end of dropwise addition, stirring was carried out at room temperature for 12 hours.

[Chem. 13]

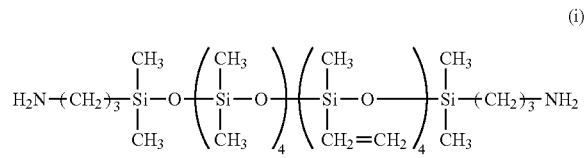

Next, 20.4 g of acetic anhydride and 26.4 g of pyridine were added to the reactor, and stirring was carried out at 50° C. for 3 hours.

The resulting reaction mixture was re-precipitated from methanol, giving a silicone-modified polyimide resin having a siloxane content of 26 wt %. The infrared absorption spectrum of this resin was measured, whereupon absorption based on polyamic acid (unreacted functional groups) was not observed; imide group absorption at 1,780 cm$^{-1}$ and 1,720 cm$^{-1}$ was confirmed.

The weight-average molecular weight of this resin, as measured by GPC, was 35,000. A film having a thickness of 100 μm was formed on a quartz glass substrate and the light transmittance was measured, whereupon the light transmittance at a wavelength of 350 to 450 nm was 80% or more. The transmittance spectrum for this film is shown in FIG. 1.

Synthesis Example 2

A reactor equipped with a stirrer, a thermometer and a nitrogen inlet was charged with 30.6 g (0.1 mol) of dicyclohexyl-3,4,3',4'-tetracarboxylic dianhydride, 250 g of N,N-dimethylacetamide and 100 g of toluene, following which 10.3 g (0.025 mol) of 2,2-bis[4-(4-aminophenoxy)phenyl]propane was added and the reaction temperature was held at 50° C. for 3 hours. Also, 66.6 g (0.075 mol) of the siloxane of formula (i) below was added dropwise at room temperature. Following the end of dropwise addition, stirring was carried out at room temperature for 12 hours.

Next, 20.4 g of acetic anhydride and 26.4 g of pyridine were added to the reactor, and stirring was carried out at 50° C. for 3 hours.

The resulting reaction mixture was re-precipitated from methanol, giving a silicone-modified polyimide resin having a siloxane content of 62 wt %. The infrared absorption spectrum of this resin was measured, whereupon absorption based on polyamic acid (unreacted functional groups) was not observed; imide group absorption at 1,780 cm$^{-1}$ and 1,720 cm$^{-1}$ was confirmed.

The weight-average molecular weight of this resin, as measured by GPC, was 33,000. A film having a thickness of 100 μm was formed on a quartz glass substrate and the light transmittance was measured, whereupon the light transmittance at a wavelength of 350 to 450 nm was 80% or more.

Synthesis Example 3

A reactor equipped with a stirrer, a thermometer and a nitrogen inlet was charged with 22.4 g (0.1 mol) of cyclohexane-1,2,4,5-tetracarboxylic dianhydride, 250 g of N,N-dimethylacetamide and 100 g of toluene, following which 10.3 g (0.025 mol) of 2,2-bis[4-(4-aminophenoxy)phenyl]propane was added and the reaction temperature was held at 50° C. for 3 hours. Also, 66.6 g (0.075 mol) of the siloxane of formula (i) below was added dropwise at room temperature. Following the end of dropwise addition, stirring was carried out at room temperature for 12 hours.

Next, 20.4 g of acetic anhydride and 26.4 g of pyridine were added to the reactor, and stirring was carried out at 50° C. for 3 hours.

The resulting reaction mixture was re-precipitated from methanol, giving a silicone-modified polyimide resin having a siloxane content of 67 wt %. The infrared absorption spectrum of this resin was measured, whereupon absorption based on polyamic acid (unreacted functional groups) was not observed; imide group absorption at 1,780 cm$^{-1}$ and 1,720 cm$^{-1}$ was confirmed.

The weight-average molecular weight of this resin, as measured by GPC, was 31,000. A film having a thickness of 100 μM was formed on a quartz glass substrate and the light transmittance was measured, whereupon the light transmittance at a wavelength of 350 to 450 nm was 80% or more.

Synthesis Example 4

A reactor equipped with a stirrer, a thermometer and a nitrogen inlet was charged with 30.0 g (0.1 mol) of 5-(2,4-dioxacyclopentyl)-3a,4,5,9b-tetrahydronaphtho[1,2-c]furan-1,3-dione, 250 g of N,N-dimethylacetamide and 100 g of toluene, following which 12.6 g (0.025 mol) of 2,2'-[2-hydroxy-3-(3,5-dimethyl-4-amino)-benzyl-5-methyl]diphenylmethane was added and the reaction temperature was held at 50° C. for 3 hours. Also, 68.6 g (0.075 mol) of the siloxane of formula (ii) below was added dropwise at room temperature. Following the end of dropwise addition, stirring was carried out at room temperature for 12 hours.

[Chem. 14]

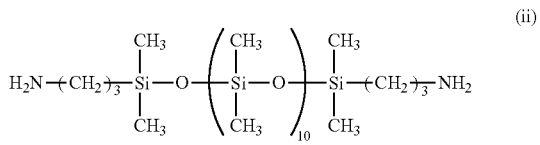

Next, 20.4 g of acetic anhydride and 26.4 g of pyridine were added to the reactor, and stirring was carried out at 50° C. for 3 hours.

The resulting reaction mixture was re-precipitated from methanol, giving a silicone-modified polyimide resin having a siloxane content of 68 wt %. The infrared absorption spectrum of this resin was measured, whereupon absorption based on polyamic acid (unreacted functional groups) was not observed; imide group absorption at 1,780 cm$^{-1}$ and 1,720 cm$^{-1}$ was confirmed.

The weight-average molecular weight of this resin, as measured by GPC, was 22,000. A film having a thickness of 100 μm was formed on a quartz glass substrate and the light transmittance was measured, whereupon the light transmittance at a wavelength of 350 to 450 nm was 80% or more.

Synthesis Example 5

A reactor equipped with a stirrer, a thermometer and a nitrogen inlet was charged with 30.0 g (0.1 mol) of 5-(2,4-dioxacyclopentyl)-3a,4,5,9b-tetrahydronaphtho[1,2-c]furan-1,3-dione, 250 g of N,N-dimethylacetamide and 100 g of toluene, following which 10.3 g (0.025 mol) of 2,2'-bis[4-(4-aminophenoxy)phenyl]propane was added and the reaction temperature was held at 50° C. for 3 hours. Also, 105.0 g (0.075 mol) of the siloxane of formula (iii) below was added dropwise at room temperature. Following the end of dropwise addition, stirring was carried out at room temperature for 12 hours.

[Chem. 15]

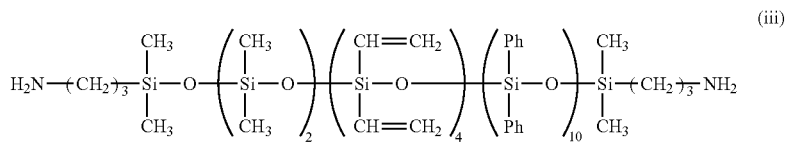

(iii)

Next, 20.4 g of acetic anhydride and 26.4 g of pyridine were added to the reactor, and stirring was carried out at 50° C. for 3 hours.

The resulting reaction mixture was re-precipitated from methanol, giving a silicone-modified polyimide resin having a siloxane content of 75 wt %. The infrared absorption spectrum of this resin was measured, whereupon absorption based on polyamic acid (unreacted functional groups) was not observed; imide group absorption at 1,780 cm$^{-1}$ and 1,720 cm$^{-1}$ was confirmed.

The weight-average molecular weight of this resin, as measured by GPC, was 31,500. A film having a thickness of 100 μm was formed on a quartz glass substrate and the light transmittance was measured, whereupon the light transmittance at a wavelength of 350 to 450 nm was 80% or more.

Comparative Synthesis Example 1

A reactor equipped with a stirrer, a thermometer and a nitrogen inlet was charged with 59.7 g (0.167 mol) of 3,3',4,4'-diphenylsulfone tetracarboxylic dianhydride, 14.4 g (0.033 mol) of bis[4-(3-aminophenoxy)phenyl]sulfone and 400 g of cyclohexanone, following which 118.0 g (0.133 mol) of the siloxane of formula (i) above was added dropwise in such a way that the internal temperature of the reaction did not exceed 50° C. Following the end of dropwise addition, stirring was carried out at room temperature for 10 hours.

Next, 40.8 g of acetic anhydride and 52.8 g of pyridine were added to the reactor, and stirring was carried out at 50° C. for 3 hours.

The resulting reaction mixture was re-precipitated from methanol, giving a silicone-modified polyimide resin having a siloxane content of 61 wt %. The infrared absorption spectrum of this resin was measured, whereupon absorption based on polyamic acid (unreacted functional groups) was not observed; imide group absorption at 1,780 cm$^{-1}$ and 1,720 cm$^{-1}$ was confirmed.

The weight-average molecular weight of this resin, as measured by GPC, was 31,000. A film having a thickness of 100 μm was formed on a quartz glass substrate and the light transmittance was measured, whereupon the light transmittance at a wavelength of 350 to 450 nm was 80% or more.

Working Example 1

A dissolved substance was obtained by adding 200 parts of isobornyl acrylate (IBXA) to 100 parts of the silicone-modified polyimide resin obtained in Synthesis Example 1 and dissolving and stirring. Next, 6 parts of Reolosil DM-30S and 3 parts of Irgacure 1173 were added to 100 parts of this dissolved substance and mixing and stirring were carried out, giving a silicone-modified polyimide resin-containing composition. The viscosity of this composition was 10 Pa·s. This silicone-modified polyimide resin composition was applied to a thickness of 1 mm onto a Teflon® plate and UV irradiated (cumulative dose, 2,000 mJ/m$^2$) using a metal halide lamp. The resulting cured film had a storage modulus of 182 MPa and was colorless, having an L* value of 96%, an a* value of −2.6% and a b* value of 7.3% in the L*a*b* color space. The result of a cross-cut test was 100/100.

Working Examples 2 to 18, Comparative Examples 1 to 6

Aside from using the compositions shown in Tables 1 to 4, these Examples were carried out in the same way as in Working Example 1. The results are presented in the same tables.

IBXA: isobornyl acrylate
LA: dodecyl acrylate (lauryl acrylate)
Irgacure 1173: available from BASF Japan
Irgacure 369: available from BASF Japan
Irgacure 819: available from BASF Japan
Irgacure TPO: available from BASF Japan
Reolosil DM-30S: from Tokuyama Corporation
AEROSIL R816: from Nippon Aerosil Co., Ltd.
X-22-174ASX: from Shin-Etsu Chemical Co., Ltd.
X-22-174DX: from Shin-Etsu Chemical Co., Ltd.
Curability: ○ Cures
  × Does not cure Working Examples 19 to 33

The die shear strengths are presented in Tables 5 and 6.

TABLE 1

| Ingredients (pbw) | Working Example | | | | | | | | |
|---|---|---|---|---|---|---|---|---|---|
| | 1 | 2 | 3 | 4 | 5 | 6 | 7 | 8 | 9 |
| Synthesis Example 1 | 100 | 100 | 100 | 100 | 100 | 100 | 100 | 100 | 100 |
| Synthesis Example 5 | — | — | — | — | — | — | — | — | — |
| IBXA | 200 | 200 | 200 | 200 | 200 | 200 | 200 | 200 | 200 |
| LA | — | — | — | — | — | — | — | — | — |
| Amounts of addition indicated below are based on a total of 100 parts of the above ingredients | | | | | | | | | |
| Irgacure 1173 | 3 | 3 | 3 | 3 | 3 | — | — | — | — |
| Irgacure 369 | — | — | — | — | — | 3 | — | — | 1 |
| Irgacure 819 | — | — | — | — | — | — | 3 | — | 1 |

TABLE 1-continued

| Ingredients (pbw) | Working Example | | | | | | | | |
|---|---|---|---|---|---|---|---|---|---|
| | 1 | 2 | 3 | 4 | 5 | 6 | 7 | 8 | 9 |
| Irgacure TPO | — | — | — | — | — | — | — | 3 | 1 |
| Reolosil DM-30S | 6 | 4 | 5 | 8 | 10 | 6 | 6 | 6 | 6 |
| AEROSIL R816 | — | — | — | — | — | — | — | — | — |
| X-22-174ASX | — | — | — | — | — | — | — | — | — |
| X-22-174DX | — | — | — | — | — | — | — | — | — |
| Curability | ○ | ○ | ○ | ○ | ○ | ○ | ○ | ○ | ○ |
| Viscosity (Pa·s) | 10 | 6 | 8 | 56 | 950 | 52 | 55 | 61 | 72 |
| Storage modulus (MPa) | 182 | 200 | 196 | 177 | 156 | 184 | 178 | 180 | 183 |
| Cross-cut test (X/100) | 100 | 100 | 100 | 100 | 100 | 100 | 100 | 100 | 100 |

TABLE 2

| Ingredients (pbw) | Working Example | | | | | | |
|---|---|---|---|---|---|---|---|
| | 10 | 11 | 12 | 13 | 14 | 15 | 16 |
| Synthesis Example 1 | 100 | 100 | 100 | 100 | 100 | — | — |
| Synthesis Example 5 | — | — | — | — | — | 100 | 100 |
| IBXA | 1,000 | 2,000 | 100 | — | 200 | 200 | 100 |
| LA | — | — | 100 | 1,000 | — | — | 100 |
| Amounts of addition indicated below are based on a total of 100 parts of the above ingredients | | | | | | | |
| Irgacure 1173 | 3 | 3 | 3 | 3 | 3 | 3 | 3 |
| Irgacure 369 | — | — | — | — | — | — | — |
| Irgacure 819 | — | — | — | — | — | — | — |
| Irgacure TPO | — | — | — | — | — | — | — |
| Reolosil DM-30S | 10 | 10 | 6 | 10 | — | 6 | 6 |
| AEROSIL R816 | — | — | — | — | 6 | — | — |
| X-22-174ASX | — | — | — | — | — | — | — |
| X-22-174DX | — | — | — | — | — | — | — |
| Curability | ○ | ○ | ○ | ○ | ○ | ○ | ○ |
| Viscosity (Pa·s) | 34 | 7 | 9 | 28 | 30 | 13 | 12 |
| Storage modulus (MPa) | 355 | 426 | 168 | 231 | 155 | 147 | 136 |
| Cross-cut test (X/100) | 100 | 100 | 100 | 100 | 100 | 100 | 100 |

TABLE 3

| Ingredients (pbw) | Working Example | | Comparative Example | | | | |
|---|---|---|---|---|---|---|---|
| | 17 | 18 | 1 | 2 | 3 | 4 | 5 |
| Synthesis Example 1 | 100 | 100 | 100 | 100 | 100 | 100 | 100 |
| Synthesis Example 5 | — | — | — | — | — | — | — |
| IBXA | 200 | 200 | 50 | 3,000 | — | 200 | 200 |
| LA | — | — | — | — | — | — | — |
| Amounts of addition indicated below are based on a total of 100 parts of the above ingredients | | | | | | | |
| Irgacure 1173 | 3 | 3 | 3 | 3 | 3 | — | — |
| Irgacure 369 | — | — | — | — | — | — | — |
| Irgacure 819 | — | — | — | — | — | — | — |
| Irgacure TPO | — | — | — | — | — | — | — |
| Reolosil DM-30S | 7 | 7 | 6 | 10 | 6 | — | 6 |
| AEROSIL R816 | — | — | — | — | — | — | — |
| X-22-174ASX | 10 | — | — | — | — | — | — |
| X-22-174DX | — | 5 | — | — | — | — | — |
| Curability | ○ | ○ | X | ○ | — | X | X |
| Viscosity (Pa·s) | 36 | 52 | — | 2 | — | 2 | 10 |
| Storage modulus (MPa) | 44 | 21 | — | 633 | — | — | — |
| Cross-cut test (X/100) | 100 | not measurable | — | 80 | — | — | — |

In Working Example 18, the tape did not stick to the silicone-modified polyimide resin-containing film that had been applied onto the glass.

In Comparative Example 1, the silicone-modified polyimide resin did not dissolve.

In Comparative Example 3, mixture did not occur.

TABLE 4

| Ingredient (pbw) | Comparative Example 6 |
|---|---|
| Synthesis Example 1 | 100 |
| Synthesis Example 5 | — |
| IBXA | 200 |
| LA | — |

TABLE 4-continued

| Ingredient (pbw) | Comparative Example 6 |
|---|---|
| Amounts of addition indicated below are based on a total of 100 parts of the above ingredients | |
| Irgacure 1173 | 3 |
| Irgacure 369 | — |
| Irgacure 819 | — |
| Irgacure TPO | — |
| Reolosil DM-30S | — |
| AEROSIL R816 | — |
| X-22-174ASX | — |
| X-22-174DX | — |
| Curability | ○ |
| Viscosity (Pa·s) | 2 |
| Storage modulus (MPa) | 182 |
| Cross-cut test (X/100) | 100 |

Working Examples 19 to 33

The die shear strengths in above Working Examples 1, 5, 7, 8, 9, 10, 13, 15, 16 and 17 are shown in Tables 5 and 6 below.

TABLE 5

| | Working Example | | | | | | |
|---|---|---|---|---|---|---|---|
| | 19 | 20 | 21 | 22 | 23 | 24 | 25 |
| Composition | Working Example 1 | Working Example 1 | Working Example 1 | Working Example 1 | Working Example 5 | Working Example 7 | Working Example 8 |
| Base substrate | glass | glass | glass | brass | brass | brass | brass |
| Cylinder substrate | glass | glass | black glass | black glass | black glass | black glass | black glass |
| Environment | in nitrogen | in air | in air | in air | in air | in air | in air |
| Die shear strength (MPa) | 48.0 | 24.6 | 17.4 | 16.3 | 20.1 | 26.1 | 19.8 |

TABLE 6

| | Working Example | | | | | | | |
|---|---|---|---|---|---|---|---|---|
| | 26 | 27 | 28 | 29 | 30 | 31 | 32 | 33 |
| Composition | Working Example 9 | Working Example 10 | Working Example 13 | Working Example 15 | Working Example 15 | Working Example 16 | Working Example 16 | Working Example 17 |
| Base substrate | brass | brass | brass | glass | brass | glass | brass | brass |
| Cylinder substrate | black glass | black glass | black glass | black glass | black glass | black glass | black glass | black glass |
| Environment | in air | in air | in air | in air | in air | in air | in air | in air |
| Die shear strength (MPa) | 17.9 | 25.6 | 24.4 | 18.7 | 15.8 | 20.5 | 16.1 | 17.9 |

Working Example 34

Composition 34 was obtained by adding 5 parts of an epoxy group-containing acrylate (EN-1010, from Shin-Nakamura Chemical Co., Ltd.) as a modifying additive to 100 parts of the composition of Working Example 5, and stirring and mixing. A cross-cut test was carried out using Composition 34, whereupon the result was 100/100. The elastic modulus of the film was 214 MPa. Using this composition, a glass cylinder was bonded onto a glass substrate by UV irradiation in air, following which the die shear strength was measured and found to be 32.3 MPa.

Working Examples 35 to 37

The coefficients of kinetic friction for the films obtained in Working Examples 1, 17 and 18 were measured. The results are shown in Table 7.

<Coefficient of Kinetic Friction>

The coefficient of kinetic friction was determined under a load of 200 g and at a travel rate of 0.3 m/s using the AGS-X horizontal tensile tester (Shimadzu Corporation). The coefficient of kinetic friction was obtained when moving wood-free paper over a substrate prepared by applying the silicone-modified polyimide resin onto glass and curing.

TABLE 7

| | Working Example 35 | Working Example 36 | Working Example 37 |
|---|---|---|---|
| Film | Working Example 1 | Working Example 17 | Working Example 18 |
| Coefficient of kinetic friction | 0.87 | 0.44 | 0.10 |

Working Example 38

RDW-B01 (Wako Pure Chemical Industries, Ltd.) was added as a blue dye to the composition of Working Example 1 in an amount of 0.005 wt % per 100 parts of the dissolved substance obtained by dissolving the silicone-modified polyimide resin in IBXA and was stirred and dissolved, giving a blue silicone-modified polyimide resin-containing composition. The viscosity of this composition was 10 Pa·s. This blue silicone-modified polyimide resin composition was applied to a thickness of 1 mm onto a Teflon® plate and UV irradiated (cumulative dose, 2,000 mJ/m$^2$) using a metal halide lamp. The blue cured film thus obtained had a storage modulus of 182 MPa and had a blue color with, in the L*a*b* color space, an L* value of 2%, an a* value of 21.7% and a b* value of −24.2%. The cross-cut test result was 100/100.

The silicone-modified polyimide resins of Synthesis Examples 1 to 5 all had light transmittances at wavelengths of 350 nm to 450 nm of at least 80%.

In Comparative Examples 1 to 6, the solubility, viscosity and curability of the compositions were inadequate because the formulation called for in the present invention is not satisfied. In contrast, each of the cured films obtained in Working Examples 1 to 17 had an excellent thixotropy because it fell within the target viscosity range, and moreover exhibited a good adhesion and a good storage modulus (MPa).

In Working Examples 19 to 34, the inventive compositions exhibited good bond strengths to glass and brass, even in nitrogen and in air. In Working Examples 36 and 37, the coefficient of kinetic friction was lowered by the addition of a leveling agent as component (I).

INDUSTRIAL APPLICABILITY

The silicone-modified polyimide resin-containing composition of the invention, because it has flowability at normal temperature and moreover has thixotropy, prevents liquid sag due to a low loading of inorganic compound filler or prevents air bubble entrainment and unevenness during application due to a high loading, and also exhibits thixotropy that maintains moldability. As a result, it is well-suited for use as an adhesive and as a coating agent. Moreover, the cured product obtained after curing the composition with ultraviolet light and/or visible light, in spite of having a low elasticity, serves as an adhesive endowed with good bond strength or as a coating agent having good adhesion.

The invention claimed is:

1. A solventless silicone-modified polyimide resin composition which has a viscosity at 25° C. of from 3 to 1,000 Pa·s, which has flowability at 25° C., and which is free of solvent, said composition comprising:
(A) 100 parts by weight of a silicone-modified polyimide resin of formula (1) below $$\text{E}_e\text{-F}_f\text{-G}_g \tag{1}$$

wherein recurring units of E or G are randomly bonded to F,
E being a divalent residue of formula (2) from a diamino-modified silicone

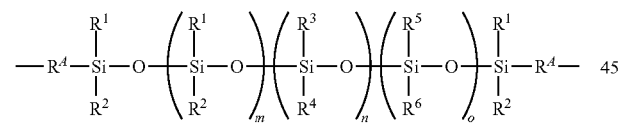

(2)

wherein $R^4$ is a substituted or unsubstituted divalent hydrocarbon group of 1 to 10 carbon atoms, $R^1$ and $R^2$ are each independently a substituted or unsubstituted methyl group, ethyl group, or propyl group, $R^3$ is independently a substituted or unsubstituted alkyl group of 1 to 10 carbon atoms or alkenyl group of 2 to 10 carbon atoms, $R^4$ is independently a substituted or unsubstituted alkenyl group of 2 to 10 carbon atoms, $R^5$ is independently a substituted or unsubstituted alkyl group of 1 to 10 carbon atoms or a monovalent aryl group of 5 to 12 carbon atoms or aralkyl group of 7 to 16 carbon atoms, $R^6$ is independently a monovalent aryl group of 5 to 12 carbon atoms or aralkyl group of 7 to 16 carbon atoms, and the subscripts m, n, and o are each integers from 1 to 20 which satisfy the conditions n+o≥2 and m+n+o=3 to 60,
F being a residue of formula (3) from a tetracarboxylic dianhydride

(3)

wherein lm is a cyclic group containing on an end a cyclic imide structure, and X is a single bond, an oxygen atom, a sulfur atom, a sulfide group, a sulfone group, a carbonyl group, —$NR^N$—, $R^N$ being a linear, branched or cyclic monovalent hydrocarbon group of 1 to 12 carbon atoms, —$CR^B{}_2$—, each $R^B$ being independently a hydrogen atom or a substituted or unsubstituted monovalent hydrocarbon group of 1 to 12 carbon atoms, —$R^{Ar}{}_h$—, $R^{Ar}$ being a divalent arylene group of 6 to 12 carbon atoms, and the subscript h being an integer from 1 to 6, a trivalent or tetravalent group obtained by detaching one or two hydrogen atoms from an arylene group, —$R^{Ar}{}_h(OR^{Ar})_i$—, $R^{Ar}$ and h being defined in the same way as above, and the subscript i being from 1 to 5, a linear, branched or cyclic alkylene group of 1 to 12 carbon atoms, a trivalent group obtained by detaching one hydrogen atom from the alkylene group, or a divalent to tetravalent organic group selected from among arylenealkylene groups, and
G being other than E, a divalent residue from a diamine, f+e+g=100 mol %, and the molar ratio f/(e+g) is from 0.8 to 1.2;
(B) from 100 to 2,000 parts by weight of a polymerizable compound;
(C) from 0.1 to 30 parts by weight of a polymerization initiator per 100 parts by weight of components (A) and (B) combined; and
(D) from 1 to 50 parts by weight of hydrophobic fumed silica per 100 parts by weight of components (A) and (B) combined.

2. The solventless silicone-modified polyimide resin composition of claim 1, wherein lm is selected from the following groups

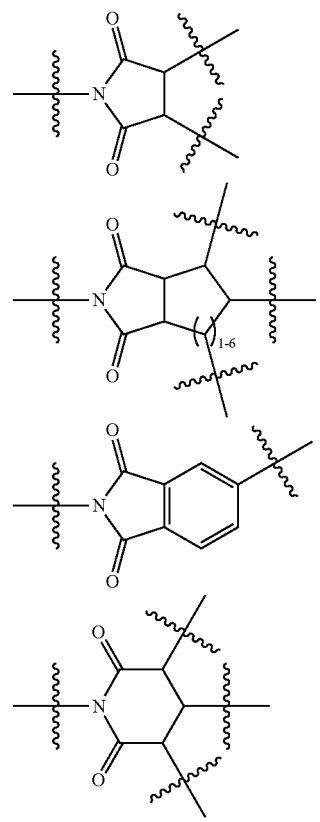

-continued

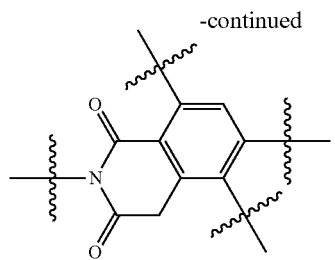

wherein bond symbols with a squiggly line represent sites available for bonding, with those sites on a nitrogen atom bonding to E or G and other sites bonding to X.

3. The solventless silicone-modified polyimide resin composition of claim 1, wherein component (B) is a radical polymerizable compound.

4. The solventless silicone-modified polyimide resin composition of claim 3, wherein component (B) is a (meth)acrylate ester compound.

5. The solventless silicone-modified polyimide resin composition of claim 1, wherein component (C) is a thermally decomposing radical initiator or a radiation-activated initiator.

6. The solventless silicone-modified polyimide resin composition of claim 1, wherein component (D) is a hydrophobic fumed silica having a bulk density lower than 1 g/mL, an average primary particle size of from 1 to 100 nm, and a BET specific surface area of from 100 to 300 m$^2$/g.

7. The solventless silicone-modified polyimide resin composition of claim 1, further comprising (H) a modifying additive.

8. The solventless silicone-modified polyimide resin composition of claim 1, further comprising (I) a leveling agent.

9. The solventless silicone-modified polyimide resin composition of claim 1, further comprising (J) a dye.

10. An adhesive comprising the composition of claim 1.

11. A coating agent comprising the composition of claim 1.

12. A cured silicone-modified polyimide resin film obtained by curing a solventless silicone-modified polyimide resin composition which has a viscosity at 25° C. of from 3 to 1,000 Pa·s, which has flowability at 25° C., and which is free of solvent, said composition comprising:

(A) 100 parts by weight of a silicone-modified polyimide resin of formula (1) below

wherein recurring units of E or G are randomly bonded to F, E being a divalent residue of formula (2) from a diamino-modified silicone

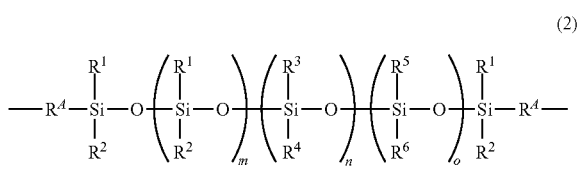

wherein $R^A$ is a substituted or unsubstituted divalent hydrocarbon group of 1 to 10 carbon atoms, $R^1$ and $R^2$ are each independently a substituted or unsubstituted methyl group, ethyl group, or propyl group, $R^3$ is independently a substituted or unsubstituted alkyl group of 1 to 10 carbon atoms or alkenyl group of 2 to 10 carbon atoms, $R^4$ is independently a substituted or unsubstituted alkenyl group of 2 to 10 carbon atoms, $R^5$ is independently a substituted or unsubstituted alkyl group of 1 to 10 carbon atoms or a monovalent aryl group of 5 to 12 carbon atoms or aralkyl group of 7 to 16 carbon atoms, $R^6$ is independently a monovalent aryl group of 5 to 12 carbon atoms or aralkyl group of 7 to 16 carbon atoms, and the subscripts m, n, and o are each integers from 1 to 20 which satisfy the conditions n+o≥2 and m+n+o=3 to 60, F being a residue of formula (3) from a tetracarboxylic dianhydride -lm-X-lm- (3)

wherein lm is a cyclic group containing on an end a cyclic imide structure, and X is a single bond, an oxygen atom, a sulfur atom, a sulfide group, a sulfone group, a carbonyl group, —NR$^N$—, R$^N$ being a linear, branched or cyclic monovalent hydrocarbon group of 1 to 12 carbon atoms, —CR$^B$$_2$—, each R$^B$ being independently a hydrogen atom or a substituted or unsubstituted monovalent hydrocarbon group of 1 to 12 carbon atoms, —R$^{Ar}$$_h$—, R$^{Ar}$ being a divalent arylene group of 6 to 12 carbon atoms, and the subscript h being an integer from 1 to 6, a trivalent or tetravalent group obtained by detaching one or two hydrogen atoms from an arylene group, —R$^{Ar}$$_h$(OR$^{Ar}$)$_i$—, R$^{Ar}$ and h being defined in the same way as above, and the subscript i being from 1 to 5, a linear, branched or cyclic alkylene group of 1 to 12 carbon atoms, a trivalent group obtained by detaching one hydrogen atom from the alkylene group, or a divalent to tetravalent organic group selected from among arylenealkylene groups, and G being other than E, a divalent residue from a diamine, f+e+g=100 mol %, and the molar ratio f/(e+g) is from 0.8 to 1.2;

(B) from 100 to 2,000 parts by weight of a polymerizable compound;

(C) from 0.1 to 30 parts by weight of a polymerization initiator per 100 parts by weight of components (A) and (B) combined; and (D) from 1 to 50 parts by weight of hydrophobic fumed silica per 100 parts by weight of components (A) and (B) combined with ultraviolet light and/or visible light, wherein the film has a storage modulus of at least 1 MPa and not more than 500 MPa.

13. A cured silicone-modified polyimide resin film obtained by curing a solventless silicone-modified polyimide resin composition which has a viscosity at 25° C. of from 3 to 1,000 Pa·s, which has flowability at 25° C., and which is free of solvent, said composition comprising:

(A) 100 parts by weight of a silicone-modified polyimide resin of formula (1) below

wherein recurring units of E or G are randomly bonded to F, E being a divalent residue of formula (2) from a diamino-modified silicone

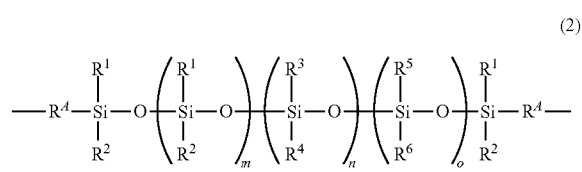

wherein $R^A$ is a substituted or unsubstituted divalent hydrocarbon group of 1 to 10 carbon atoms, $R^1$ and $R^2$ are each independently a substituted or unsubstituted methyl group, ethyl group, or propyl group, $R^3$ is independently a substituted or unsubstituted alkyl group of 1 to 10 carbon atoms or alkenyl group of 2 to 10 carbon atoms, $R^4$ is independently a substituted or unsubstituted alkenyl group of 2 to 10 carbon atoms, $R^5$ is independently a substituted or unsubstituted alkyl group of 1 to 10 carbon atoms or a monovalent aryl group of 5 to 12 carbon atoms or aralkyl group of 7 to 16 carbon atoms, $R^6$ is independently a monovalent aryl group of 5 to 12 carbon atoms or aralkyl group of 7 to 16 carbon atoms, and the subscripts m, n, and o are each integers from 1 to 20 which satisfy the conditions n+o≥2 and m+n+o=3 to 60, F being a residue of formula (3) from a tetracarboxylic dianhydride -lm-X-lm- (3)

wherein lm is a cyclic group containing on an end a cyclic imide structure, and X is a single bond, an oxygen atom, a sulfur atom, a sulfide group, a sulfone group, a carbonyl group, —$NR^N$—, $R^N$ being a linear, branched or cyclic monovalent hydrocarbon group of 1 to 12 carbon atoms, —$CR^B{}_2$—, each $R^B$ being independently a hydrogen atom or a substituted or unsubstituted monovalent hydrocarbon group of 1 to 12 carbon atoms, —$R^{Ar}{}_h$—, $R^{Ar}$ being a divalent arylene group of 6 to 12 carbon atoms, and the subscript h being an integer from 1 to 6, a trivalent or tetravalent group obtained by detaching one or two hydrogen atoms from an arylene group, —$R^{Ar}{}_h(OR^{Ar})_i$—, $R^{Ar}$ and h being defined in the same way as above, and the subscript i being from 1 to 5, a linear, branched or cyclic alkylene group of 1 to 12 carbon atoms, a trivalent group obtained by detaching one hydrogen atom from the alkylene group, or a divalent to tetravalent organic group selected from among arylenealkylene groups, and G being other than E, a divalent residue from a diamine, f+e+g=100 mol %, and the molar ratio f/(e+g) is from 0.8 to 1.2;

(B) from 100 to 2,000 parts by weight of a polymerizable compound;

(C) from 0.1 to 30 parts by weight of a polymerization initiator per 100 parts by weight of components (A) and (B) combined; and (D) from 1 to 50 parts by weight of hydrophobic fumed silica per 100 parts by weight of components (A) and (B) combined with ultraviolet light and/or visible light, wherein the film has a light transmittance at wavelengths in the visible light spectrum of at least 80% and has, in the L*a*b* color space, an L* value of at least 80, an a* value of at least−10 and less than 10 and a b* value of at least −10 and less than 10.

14. The solventless silicone-modified polyimide resin composition of claim 1, wherein E is a divalent residue having one of following formulas

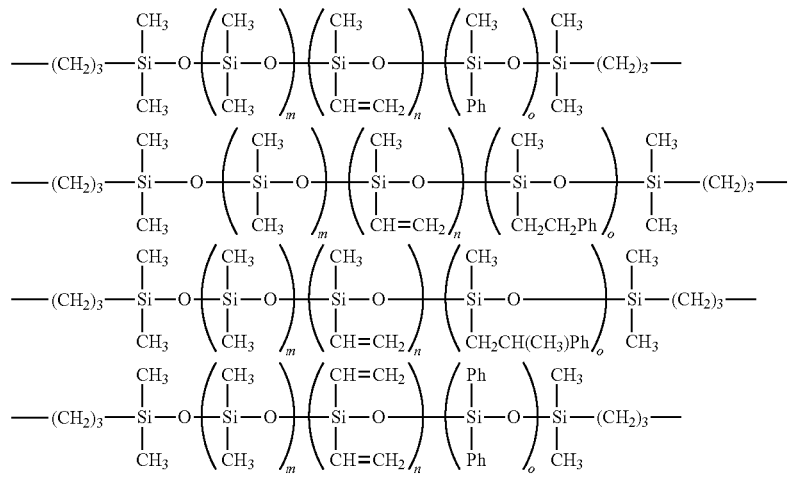

wherein Ph is a phenyl group, and the subscripts m, n, and o are as defined above.

15. The solventless silicone-modified polyimide resin composition of claim 1, wherein the subscript m is from 2 to 20, the subscript n is from 4 to 20, and the subscript o is from 10 to 20 and m, n, and o satisfy the conditions n+o≥14 and m+n+o=16 to 60.

16. The solventless silicone-modified polyimide resin composition of claim 1, wherein, in formula (3), $R^B$ is independently a hydrogen atom or an unsubstituted monovalent hydrocarbon group of 1 to 12 carbon atoms.

17. The solventless silicone-modified polyimide resin composition of claim 1, wherein the weight-average molecular weight of the silicone-modified polyimide resin of component (A) is from 10,000 to 70,000.

18. The solventless silicone-modified polyimide resin composition of claim 6, comprising from 5 to 20 parts by weight of said hydrophobic fumed silica per 100 parts by weight of components (A) and (B) combined.

19. The cured silicone-modified polyimide resin film of claim 12, having a die shear strength in the range 15.8 through 48.0 MPa.

20. The solventless silicone-modified polyimide resin composition of claim 1, wherein the composition has a viscosity at 25° C. of from 8 to 150 Pa·s.

* * * * *